US012738021B2

(12) United States Patent
Watanabe

(10) Patent No.: US 12,738,021 B2
(45) Date of Patent: Sep. 15, 2026

(54) INFORMATION PROCESSING DEVICE, INFORMATION PROCESSING METHOD, AND RECORDING MEDIUM

(71) Applicant: NEC Corporation, Tokyo (JP)

(72) Inventor: Yoshikazu Watanabe, Tokyo (JP)

(73) Assignee: NEC CORPORATION, Tokyo (JP)

(*) Notice: Subject to any disclaimer, the term of this patent is extended or adjusted under 35 U.S.C. 154(b) by 295 days.

(21) Appl. No.: 18/691,522

(22) PCT Filed: Oct. 4, 2021

(86) PCT No.: PCT/JP2021/036589
§ 371 (c)(1),
(2) Date: Mar. 13, 2024

(87) PCT Pub. No.: WO2023/058082
PCT Pub. Date: Apr. 13, 2023

(65) Prior Publication Data

US 2024/0378855 A1 Nov. 14, 2024

(51) Int. Cl.
*G06V 10/74* (2022.01)
*G06V 10/764* (2022.01)
*G06V 10/82* (2022.01)

(52) U.S. Cl.
CPC .......... *G06V 10/761* (2022.01); *G06V 10/764* (2022.01); *G06V 2201/07* (2022.01)

(58) Field of Classification Search
CPC ............... G06V 10/761; G06V 10/764; G06V 2201/07; G06V 10/82; G06N 20/00
See application file for complete search history.

(56) References Cited

U.S. PATENT DOCUMENTS 12,183,050 B1 * 12/2024 Khinvasara ............ G06V 20/58
12,183,064 B2 * 12/2024 Se ........................ G06N 3/0464
(Continued)

FOREIGN PATENT DOCUMENTS

JP 2018-200531 A 12/2018
WO 2020/175806 A1 9/2020

OTHER PUBLICATIONS

International Search Report for PCT Application No. PCT/JP2021/036589, mailed on Dec. 14, 2021.
(Continued)

*Primary Examiner* — Amandeep Saini
*Assistant Examiner* — Andrew S Budisalich

(57) ABSTRACT

An information processing device according to the present includes a memory configured to store instructions; and one or more processors configured to execute the instructions to: apply inference target data including first target object to a first trained model to infer, as a primary inference, the first target object; classify, into any one of groups based on an attribute of the first target object inferred in the primary inference, and generate packed data having a smaller amount than an amount of the inference target data, and a correspondence between a position of the first target object in the inference target data and a position of the first target object in the packed data; apply the packed data to a plurality of second trained models to infer, as secondary inference, the first target object; and infer the first target object using results of the secondary inference and the correspondence.

6 Claims, 15 Drawing Sheets

(56) References Cited

U.S. PATENT DOCUMENTS

2019/0294177 A1 9/2019 Kwon
2022/0165054 A1* 5/2022 Olwal ........................ G06F 1/32
2022/0222569 A1* 7/2022 Croxford ............... G06N 20/00

OTHER PUBLICATIONS

English translation of Written opinion for PCT Application No. PCT/JP2021/036589, mailed on Dec. 14, 2021.
Shaoqing Ren, Kaiming He, Ross Girshick, Jian Sun, "Faster R-CNN: Towards Real-Time Object Detection with Region Proposal Networks", [online], Jan. 6, 2016, Cornel University, [Searched on Jul. 20, 2021], Internet <URL:https://arxiv.org/abs/1506.01497>, pp. 1-14.
Wei Liu, Dragomir Anguelov, Dumitru Erhan, Christian Szegedy, Scott Reed, Cheng-Yang Fu, Alexander C. Berg, "SSD:Single Shot MultiBox Detector", [online], Dec. 29, 2016, Cornel University, [Searched on Jul. 20, 2021], Internet, <URL:https://arxiv.org/abs/1512.02325>, pp. 1-17.
Tsung-Yi Lin, Priya Goyal, Ross Girshick, Kaiming He, Piotr Dollar, "Focal Loss for Dense Object Detection", [online], Feb. 7, 2018, Cornel University, [Searched on Jul. 20, 2021], Internet, <URL:https://arxiv.org/abs/1708.02002>, pp. 1-10.
Yadong Pan, Ryo Kawai, Noboru Yoshida, Hiroo Ikeda, Shoji Nishimura, "Training Physical and Geometrical Mid-Points for Multi-person Pose Estimation and Human Detection Under Congestion and Low Resolution", Jun. 21, 2020, The National Center for Biotechnology Information, [Searched on Sep. 15, 2021], Internet <URL:https://pubmed.ncbi.nlm.nih.gov/33063050/>, pp. 1-8.
JP Office Action for JP Application No. 2023-552407, mailed on Nov. 26, 2024 with English Translation.

* cited by examiner

INFORMATION PROCESSING DEVICE
1
INFERENCE RESULT
DATA
10
OBJECT INFERENCE UNIT
20
PRIMARY INFERENCE UNIT
30
DATA PACKING UNIT
40
SECONDARY INFERENCE UNIT
50
DATA STORAGE UNIT
60
DATA GENERATION UNIT
70
MODEL GENERATION UNIT
80
MODEL STORAGE UNIT
90
DATA ACQUISITION UNIT

INFORMATION PROCESSING DEVICE
10
OBJECT INFERENCE UNIT
1B
INFERENCE RESULT
DATA
90
DATA ACQUISITION UNIT
20B
PRIMARY INFERENCE UNIT
30B
DATA PACKING UNIT
40B
SECONDARY INFERENCE UNIT
80B
MODEL STORAGE UNIT
60B
DATA GENERATION UNIT
50B
DATA STORAGE UNIT
70B
MODEL GENERATION UNIT

INFORMATION PROCESSING DEVICE, INFORMATION PROCESSING METHOD, AND RECORDING MEDIUM

This application is a National Stage Entry of PCT/JP2021/036589 filed on Oct. 4, 2021, the contents of all of which are incorporated herein by reference, in their entirety.

TECHNICAL FIELD

The present invention relates to inference using machine training.

BACKGROUND ART

NPLs 1 to 3 disclose a technique of an object detection task using deep-learning. NPL 4 discloses a technique of a posture estimation task for estimating a human posture included in an image.

CITATION LIST

Non Patent Literature

NPL 1: Shaoqing Ren, Kaiming He, Ross Girshick, Jian Sun, "Faster R-CNN: Towards Real-Time Object Detection with Region Proposal Networks", [online], 6 Jan. 2016, Cornel University, [Searched on Jul. 20, 2021], Internet <URL: https://arxiv.org/abs/1506.01497>

NPL 2: Wei Liu, Dragomir Anguelov, Dumitru Erhan, Christian Szegedy, Scott Reed, Cheng-Yang Fu, Alexander C. Berg, "SSD: Single Shot MultiBox Detector", [online], 29 Dec. 2016, Cornel University, [Searched on Jul. 20, 2021, Internet, <URL: https://arxiv.org/abs/1512.02325>

NPL 3: Tsung-Yi Lin, Priya Goyal, Ross Girshick, Kaiming He, Piotr Dollar, "Focal Loss for Dense Object Detection", [online], 7 Feb. 2018, Cornel University, [Searched on Jul. 20, 2021], Internet, <URL: https://arxiv.org/abs/1708.02002>

NPL 4: Yadong Pan, Ryo Kawai, Noboru Yoshida, Hiroo Ikeda, Shoji Nishimura, "Training Physical and Geometrical Mid-Points for Multi-person Pose Estimation and Human Detection Under Congestion and Low Resolution", Jun. 21, 2020, The National Center for Biotechnology Information, [Searched on Sep. 15, 2021], Internet <URL: https://pubmed.ncbi.nlm.nih.gov/33063050/>

SUMMARY OF INVENTION

Technical Problem

Processing of inference using machine training, in particular, processing of an object detection task and a posture estimation task has a high calculation load and takes a lot of time for processing. Therefore, it is desired to improve the throughput of the inference process in the object detection task and the posture estimation task. NPLs 1 to 4 do not disclose a technique related to improvement of inference throughput. An object of the present invention is to provide an information processing device and the like that improve throughput of inference of a target object.

Solution to Problem

An information processing device according to an aspect of the present invention includes a primary inference means that apply inference target data at least part of which includes first target object to a first trained model to infer, as a primary inference, the first target object, a data packing means that classify, into any one of groups based on an attribute of the first target object, the first target object inferred in the primary inference, generate packed data that is data having a smaller amount than an amount of the inference target data for each group, and generate a correspondence between a position of the first target object in the inference target data and a position of the first target object in the packed data, a plurality of secondary inference means that apply the packed data of the groups different to each other to a second trained model to infer, as a secondary inference, the first target object, and an object inference means that infer the first target object in the inference target data using the first target object in a result of the secondary inference and the correspondence.

An information processing system according to an aspect of the present invention includes the information processing device described above, a data acquisition device that outputs inference target data to the information processing device, and a display device that acquires a result of inference from the information processing device and displays the acquired result of inference.

An information processing method according to an aspect of the present invention includes applying inference target data at least part of which includes first target object to a first trained model to infer, as a primary inference, the first target object, classifying, into any one of groups based on an attribute of the first target object, the first target object inferred in the primary inference, generate packed data that is data having a smaller amount than an amount of the inference target data for each group, and generate a correspondence between a position of the first target object in the inference target data and a position of the first target object in the packed data, applying the packed data of the groups different to each other to a second trained model to infer, as a secondary inference, the first target object, and inferring the first target object in the inference target data using the first target object in a result of the secondary inference and the correspondence.

An information processing method according to an aspect of the present invention includes performing, by an information processing device, the information processing method described above, outputting, by a data acquisition device, the inference target data to the information processing device, and acquiring, by a display device, a result of inference from the information processing device and displaying the acquired result of inference.

A recording medium according to an aspect of the present invention records a program for causing a computer to execute the steps of applying inference target data at least part of which includes first target object to a first trained model to infer, as a primary inference, the first target object, classifying, into any one of groups based on an attribute of the first target object, the first target object inferred in the primary inference, generate packed data that is data having a smaller amount than an amount of the inference target data for each group, and generate a correspondence between a position of the first target object in the inference target data and a position of the first target object in the packed data, applying the packed data of the groups different to each other to a second trained model to infer, as a secondary inference, the first target object, and inferring the first target object in the inference target data using the first target object in a result of the secondary inference and the correspondence.

Advantageous Effects of Invention

According to the present invention, it is possible to achieve an effect of improving the throughput of inference of a target object.

EXAMPLE EMBODIMENT

Hereinafter, the example embodiment of the present invention will be described with reference to the drawings. Each drawing is for describing the example embodiment of the present invention. However, each example embodiment is not limited to the description of each drawing. Each example embodiment can be appropriately combined.

First Example Embodiment

Figure 13:
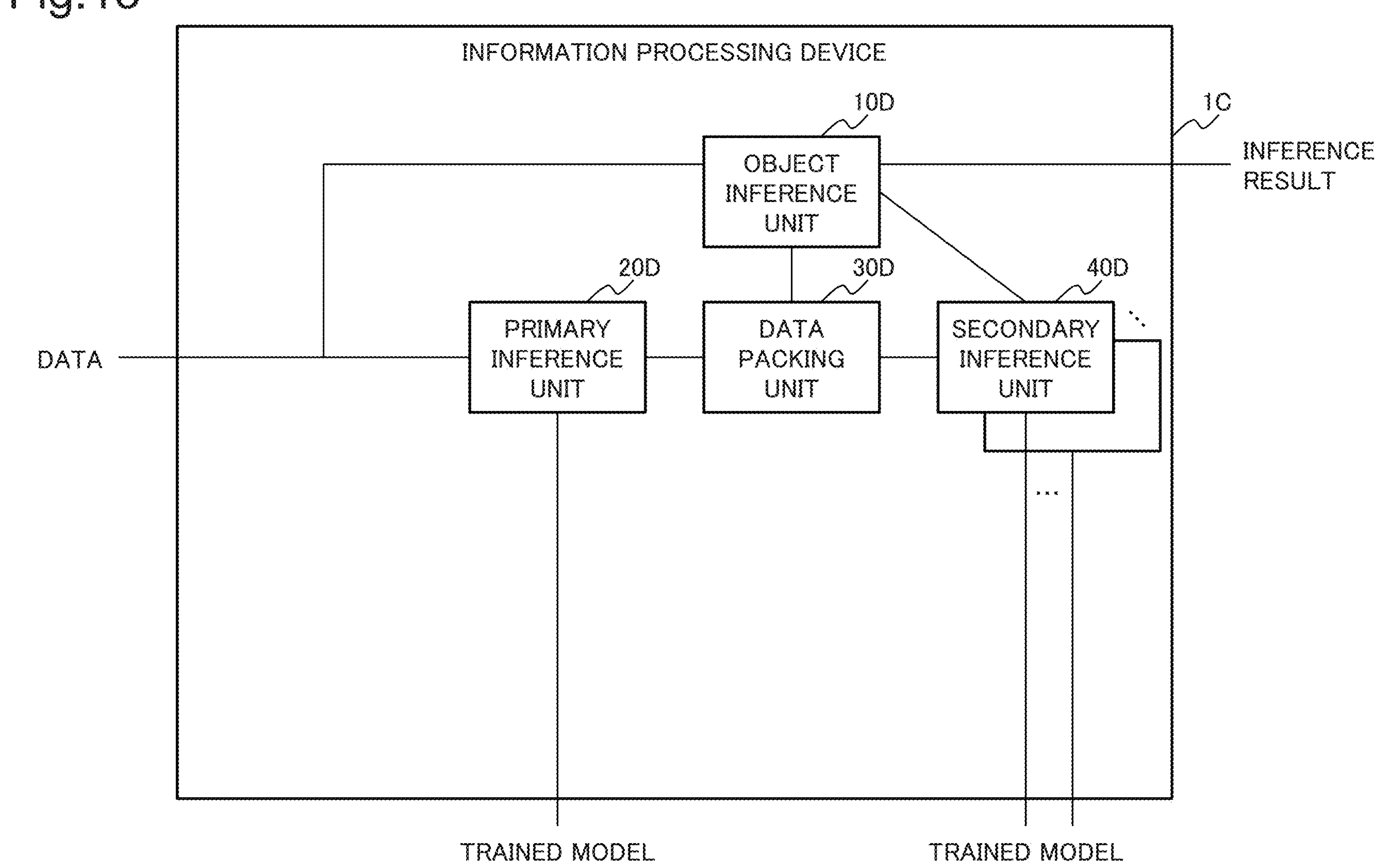
FIG. 13 is a block diagram illustrating an example of a configuration of an information processing device according to the first example embodiment.

FIG. 13 is a block diagram illustrating an example of a configuration of an information processing device 1C according to the first example embodiment of the present invention. The information processing device 1C includes an object inference unit 10D, a primary inference unit 20D, a data packing unit 30D, and a plurality of secondary inference units 40D. The primary inference unit 20D applies inference target data at least part of which includes the first target object to the first trained model to infer, as the primary inference, the first target object. The data packing unit 30D classifies the first target objects inferred in the primary inference into any one of groups based on the attribute of the first target object. Then, the data packing unit 30D generates packed data that is data having a smaller amount than the inference target data for each group. Then, the data packing unit 30D generates a correspondence between the position of the first target object in the inference target data and the position of the first target object in the packed data. The secondary inference unit 40D applies the packed data of the groups different to each other to the second trained model to infer, as the secondary inference, the first target object. The object inference unit 10D infers the first target object in the inference target data using the first target object in the result of the secondary inference and the correspondence.

The information processing device 1C configured as described above generates packed data obtained by packing the inference target data for each group of the first target objects classified based on the attribute of the first target object. Then, the information processing device IC infers the target object in the inference target data using the result of the secondary inference using the packed data for each group and the correspondence between the inference target data of the target object and the position of the packed data. The packed data is data including a target object in the original data and having a small number of pieces of data. Therefore, the information processing device IC improves the throughput of inference of the target object. Furthermore, the information processing device IC executes secondary inference on the packed data packed for each of the plurality of groups classified based on the attribute of the first target object. That is, the information processing device 1C executes secondary inference related to the attribute of the first target object. For example, as will be described in detail later, for a group having a low inference difficulty level, the information processing device 1C can improve the inference throughput while maintaining the accuracy by using the secondary inference using the trained model that has not high accuracy as the secondary inference but that has a lightweight and a high-speed or the inference parameter. On the other hand, for a group having a high inference difficulty level, the information processing device 1C can execute inference avoiding degradation in accuracy by using secondary inference using a trained model or an inference parameter having high accuracy. In this manner, the information processing device 1C improves the throughput of inference of the target object while maintaining the accuracy.

Second Example Embodiment

As one of main tasks using machine training, there is an object detection task in an image. The object detection task is a task of generating a list of sets of a position and a class (type) of a target object present in an image. In recent years, among machine training, in particular, an object detection task using deep-learning has been widely used. The object detection task is given a training image group and information about a target object in each image as correct answer data in a training phase of machine training. The information about the target object is selected according to the specification of the object detection task. For example, the information about the target object includes coordinates (bounding box (BB)) of four vertices of a rectangular region in which the target object appears and a class of the target object. In the following description, the BB and the class will be used as an example of the information about the target object. Then, the object detection task generates a trained model as a result of machine training using deep-learning, for example, using the training image group and the information about the target object. In the detection phase, the object detection task applies the trained model to the image including the target object to infer the target object included in the image to output a set of the BB and the class for each target object included in the image. The object detection task may output an evaluation result of the result of the object detection together with the BB and the class. As the evaluation result, confidence is often used, but not limited thereto, other values may be used.

For example, a person and vehicle monitoring system can be constructed using an object detection task. For example, a user of the system inputs an image from the monitoring camera to the object detection task. The object detection task detects positions and classes of a person and a vehicle in an image. Then, the user may determine the person and the vehicle appearing in the image of the monitoring camera by using the positions and classes of the person and the vehicle detected by the object detection task. The object detection task may be used in combination with other recognition processing. For example, a license plate recognition system can be constructed by combining an object detection task of detecting a license plate of a car and an optical character recognition (OCR) process of recognizing characters on the detected license plate.

As another task, there is a posture estimation task of estimating a human posture included in an image. The posture estimation task includes, for example, processing of extracting feature points (keypoints) such as eyes, nose, elbows, and knees, and processing of generating a human posture by combining the feature points. Although the posture estimation task is not limited to the following, for example, deep-learning may be used for a keypoint extraction process of extracting feature points, and non-deep-learning may be used for processing of generating a posture. In the keypoint extraction process, in the inference phase, the trained model is applied to the image including the target, and the keypoints of the eyes, the nose, and the like included in the image is inferred. Then, in the keypoint extraction process, for each of the inferred keypoints, the coordinates and the class of the keypoint and confidence of the inference are output.

High throughput is required for processing the object detection task and the posture estimation task. For example, in order to prevent overlooking, the monitoring camera is required to acquire an image at a high frame rate to some extent. Specifically, in the case of targeting an object moving at a high speed such as a car, the monitoring camera is desired to operate at a frame rate of 10 frame per second (fps) or more, for example. Therefore, the object detection task or the like is required to detect an object in an image with a high frame rate acquired by a monitoring camera.

Furthermore, in a system that detects an object in an image acquired by a monitoring camera, a configuration is assumed in which the monitoring camera or a device around the monitoring camera, that is, an edge executes the inference process in an object detection task. However, in the edge, an installation place, cooling, power, and the like are restricted, and only limited calculation resources can be used in many cases. Processing such as an object detection task is required to have a certain high throughput even in such an edge environment.

However, the process of inference using machine training, in particular, the process of the object detection task and the posture estimation task has a high calculation load and takes a lot of time. As a result, the throughput performance of the object detection task and the posture estimation task is generally likely to be low. Therefore, it is desired to improve the throughput of the inference process in the object detection task and the posture estimation task.

Figure 1:
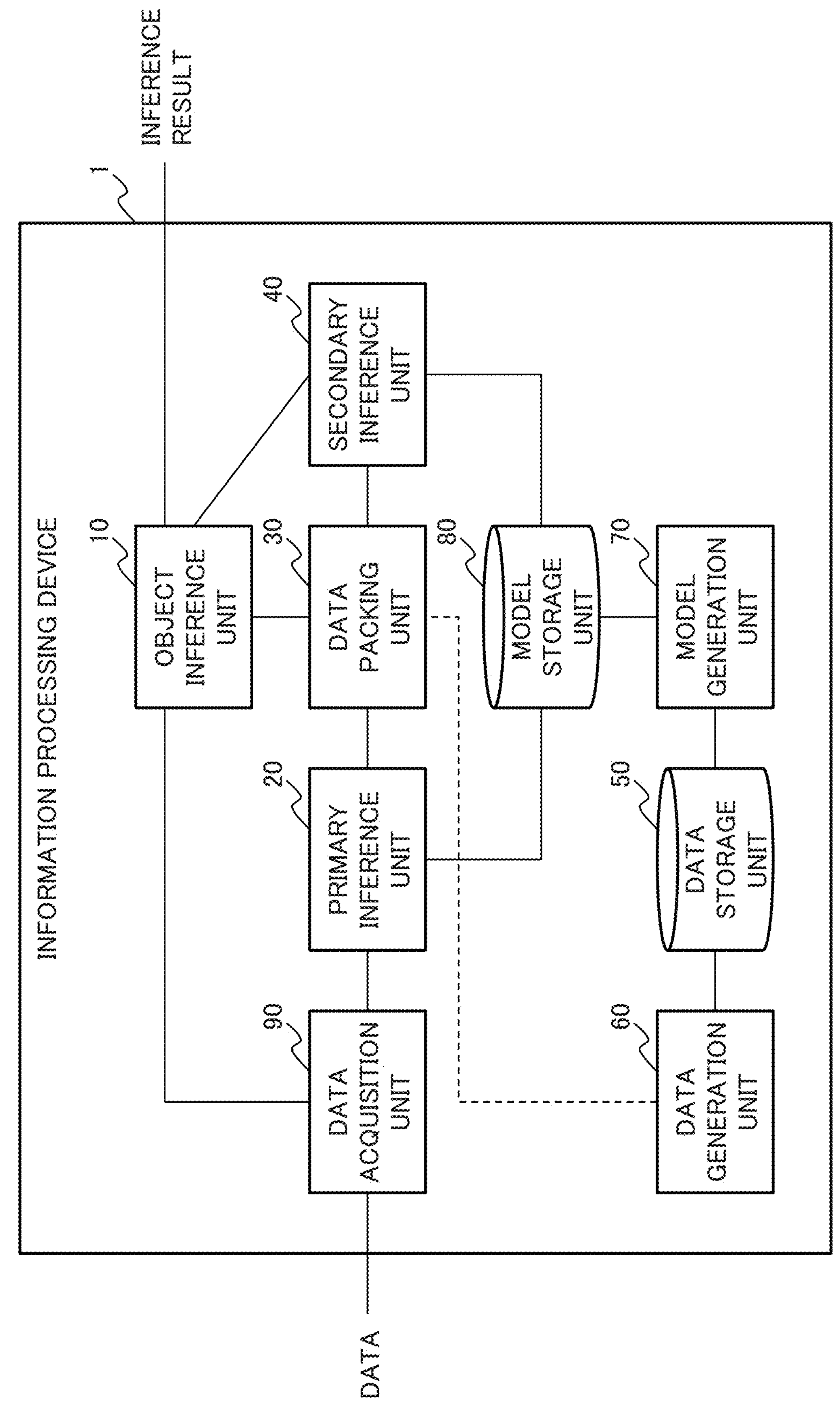
FIG. 1 is a block diagram illustrating an example of a configuration of an information processing device according to the second example embodiment.

Therefore, in the second example embodiment, inference throughput is improved using a configuration described in detail below. A configuration of the second example embodiment will be described with reference to the drawings. FIG. 1 is a block diagram illustrating an example of a configuration of an information processing device 1 according to the second example embodiment. In the following description including the present example embodiment, the following is used as an example:

(1) inference target data: an image (a still image or a moving image) captured by a camera or the like, (2) a task of inference: an object detection task or a posture estimation task for an image, (3) a result of inference: a set of "BB or Keypoint, class, and confidence", and (4) a target object: a license plate (LP) of the vehicle or a posture.

However, these do not limit the present example embodiment. For example, the present example embodiment may use data different from the image as data to be processed. For example, the present example embodiment may use depth data acquired using a depth sensor as data to be processed. Alternatively, the present example embodiment may use three-dimensional data acquired using light detection and ranging (LIDAR) as data to be processed. Alternatively, the result of the inference in the present example embodiment is not limited to the set of "BB or Keypoint, class, and confidence". For example, the present example embodiment may infer a target object included in the BB. In the following description, a set of "BB, class, and confidence" may be simply referred to as a "BB" for convenience of description.

A configuration of the second example embodiment will be described with reference to the drawings. FIG. 1 is a block diagram illustrating an example of a configuration of an information processing device 1 according to the second example embodiment. The information processing device 1 includes an object inference unit 10, a primary inference unit 20, a data packing unit 30, a secondary inference unit 40, a data storage unit 50, a data generation unit 60, a model generation unit 70, a model storage unit 80, and a data acquisition unit 90. The number of components and the connection relationship illustrated in FIG. 1 are an example. For example, the information processing device 1 may include a plurality of data acquisition units 90. The information processing device 1 may be configured using a computer device including a central processing unit (CPU), a main memory, and a secondary storage device. In this case, the components of the information processing device 1 illustrated in FIG. 1 indicate functions implemented using a CPU or the like. The hardware configuration will be further described later.

In the information processing device 1, a configuration for controlling the operation of each component is any configuration. For example, the information processing device 1 may include a control unit (not illustrated) that controls each component. Alternatively, a predetermined configuration may control the operations of components such as the primary inference unit 20, the data packing unit 30, and the secondary inference unit 40. Alternatively, for example, the object inference unit 10 may control the operations of the components such as the primary inference unit 20, the data packing unit 30, and the secondary inference unit 40. In this manner, the predetermined configuration may control another configuration. Alternatively, each component may independently acquire data from another component and operate. Alternatively, each component may begin the operation upon acquiring data from another component. Therefore, in the following description, the description regarding the control of the operation of the component is omitted unless otherwise necessary.

(1) Data Acquisition Unit 90

The data acquisition unit 90 acquires data including an object to be inferred from a predetermined device. Hereinafter, an object to be inferred is referred to as a "target object". Data including the target object is referred to as "inference target data". At least part of the inference target data may include the target object. That is, at least part of the inference target data may not include the target object. A device from which the data acquisition unit 90 acquires the inference target data is any device. For example, the data acquisition unit 90 may acquire an image, as the inference target data, from the monitoring camera.

(2) Primary Inference Unit 20

The primary inference unit 20 infers a target object in the inference target data. Hereinafter, the inference by the primary inference unit 20 is referred to as "primary inference". The primary inference unit 20 may infer an object having a predetermined positional relationship with the target object in addition to the target object as a target of the primary inference. The object having the predetermined positional relationship with the target object is, for example, a peripheral object of the LP, but is not limited thereto. Hereinafter, an object having the predetermined positional relationship with the target object is referred to as a "sub-target object". In the following description, the primary inference unit 20 infers the target object and the sub-target object. However, this does not limit the operation of the primary inference unit 20. The primary inference unit 20 may not infer the sub-target object. In the following description, the inference target object in the information processing device 1 may be referred to as a "first target object", and the sub-target object may be referred to as a "second target object".

The predetermined positional relationship is any relationship. The operator may set the positional relationship of the sub-target objects related to the target object. For example, an example of the positional relationship is "the target object is included in the sub-target object" or "the sub-target object includes the target object". For example, when the target object is an LP of the vehicle, the sub-target objects are a front face and a rear face, of the vehicle, containing the LP. Hereinafter, the front face and the rear face, of the vehicle, including the LP may be collectively referred to as a "vehicle front and rear face". However, this does not limit the positional relationship in the second example embodiment.

The primary inference unit 20 uses machine training in the primary inference. Specifically, the primary inference unit 20 infers the target object and the sub-target object in the inference target data using the trained model generated using the machine training stored in the model storage unit 80. Hereinafter, the trained model used by the primary inference unit 20 is referred to as a "trained model for primary inference" or a "first trained model". The primary inference unit 20 may correct the inference target data when applying the inference target data to the trained model for primary inference. For example, in a case where the inference target data is an image, the primary inference unit 20 may change the size or the aspect ratio of the image.

(3) Data Packing Unit 30

The data packing unit 30 executes a process described below using the target object included in the result of the primary inference. However, in a case where the primary inference unit 20 infers a sub-target object in addition to the target object, the data packing unit 30 may use the sub-target object in addition to the target object. In the following description, the data packing unit 30 uses a target object and a sub-target object. However, the data packing unit 30 may not use the sub-target object. In this case, the data packing unit 30 may omit the operation related to the sub-target object in the following description.

The data packing unit 30 executes a predetermined process on the target object included in the result of the primary inference. For example, the predetermined process is discarding of the BB, filtering of the BB, or adjustment of the BB. Hereinafter, this process is referred to as a "post-process". The data packing unit 30 may execute a post-process on part of the target object included in the result of the primary inference, or may execute a post-process on all the target objects. Furthermore, the data packing unit 30 may execute a post-process on part or all of the sub-target object included in the result of the primary inference. In the following description, as an example, the data packing unit 30 executes a post-process on all target objects and sub-target objects. However, the post-process in the data packing unit 30 is not limited thereto.

Further, the data packing unit 30 generates data including a region of the target object and a region of the sub-target object in the inference target data and having a smaller number of pieces of data than the inference target data. Hereinafter, data generated as data having a smaller number of pieces of data than the inference target data is referred to as "packed data". Hereinafter, this process is referred to as "packing". That is, "packing" means extracting or duplicating regions including the target object and the sub-target object in the result of the primary inference from the inference target data, and collecting the extracted or duplicated regions to generate packed data that is data of an amount smaller than the number of pieces of inference target data.

In the packed data, the number of pieces of data that is reduced from the inference target data is any number. The operator may determine the amount of data in accordance with the target object and the inference operation. For example, when the number of data is used as the number of pieces of data, the packed data is data having a smaller number of data than the inference target data. For example, when the data is a still image, the number of pieces of data is the number of still images. Alternatively, in a case where the data is a moving image having a fixed time length, the number of pieces of data is, for example, the number of moving images. In a case where the amount of data is used as the number of pieces of data, the packed data is data having a smaller amount of data than the inference target data. The amount of data is, for example, a capacity or an area. For example, when the data is a still image, the amount of data is the amount of data of the entire still image. Alternatively, when the data is a video, the amount of data is a time length of the video.

Furthermore, in the generation of the packed data, the data packing unit 30 generates a correspondence between the positions of the target object and the sub-target object in the inference target data and the positions of the target object and the sub-target object in the packed data, respectively. Hereinafter, the correspondence between the positions of the target object and the sub-target object in the inference target data and the respective positions of the target object and the sub-target object in the packed data is referred to as a "packing correspondence". For example, in a case of inferring the BB, the data packing unit 30 generates coordinate transformation between the positions, orientations, and sizes of the BB of the target object and the BB of the sub-target object in the inference target data and the respective positions, orientations, and sizes in the packed data as the packing correspondence.

In a case where the data is an image, the data packing unit 30 may generate an image having a size different from the size of the image in the inference target data as an image in the packed data. For example, the operator of the information processing device 1 may set the size of the image in the packed data in the data packing unit 30 based on the size of the inference target data, the performance of the hardware of the information processing device 1, and the processing performance and the calculation accuracy of the trained model used for inference, and the like. The packed data is data used for inference by the secondary inference unit 40 to be described later. The inference target data is data used for inference by the primary inference unit 20. That is, the information processing device 1 may use data of different sizes in the primary inference unit 20 and the secondary inference unit 40. For example, in a case where the data is an image, the information processing device 1 may use images of different sizes in the primary inference unit 20 and the secondary inference unit 40.

Next, details of the post-process and the packing in the data packing unit 30 will be described. The "post-process" and the "packing" in the data packing unit 30 are collectively referred to as "data packing". That is, the operation of "data packing" is an operation including an operation of the "post-process" before generation of packed data and an operation of "packing". However, the data packing unit 30 may not execute the "post-process". In this case, the data packing is an operation of "packing" in the following description.

(3-1) Post-Process

The data packing unit 30 executes the post-process described below before generating the packed data. For example, the data packing unit 30 discards an unnecessary region of the sub-target object from the result of the primary inference by using the positional relationship between the target object and the sub-target object and the result of the primary inference. For example, among the sub-target objects included in the result of the primary inference, the data packing unit 30 discards a sub-target object in which the target object having a predetermined positional relationship with the sub-target object is included in the result of the primary inference. Alternatively, the data packing unit 30 may discard the BB of the sub-target object related to the target object inferred as a result of the primary inference. In other words, the data packing unit 30 uses, as the packing target, a sub-target object in which the target object in a predetermined positional relationship in the sub-target object included in the result of the primary inference is not included in the result of the primary inference. The reason why this operation is used will be described using the "positional relationship in which the sub-target object includes the target object" and the "BB".

The BB of the target object included in the result of the primary inference is included in the packed data in the packing operation to be described later. Therefore, even when the BB of the sub-target object including the target object included in the result of the primary inference is not included in the packed data, the BB of the target object is included in the packed data. In a case where the BB of the sub-target object is included in the packed data, the packed data includes the duplicate BB as the BB of the target object. This adds an unnecessary load in the secondary inference. Therefore, the data packing unit 30 discards such a sub-target object. As a result, the information processing device 1 can improve the throughput as compared with the case of using the BB of the sub-target object. On the other hand, the BB of the sub-target object in which the target object is not included in the result of the primary inference may include the target object not inferred in the primary inference. Therefore, when the BB of such a sub-target object is included in the packed data, the information processing device 1 can improve the accuracy of the secondary inference.

In this manner, the data packing unit 30 discards a sub-target object in which the target object is included in the result of the primary inference among the sub-target objects. In other words, the data packing unit 30 uses, as the packing target, a sub-target object in which the target object in the predetermined positional relationship is not included in the result of the primary inference among the sub-target objects in the predetermined positional relationship with the target object. As a result of this operation, the data packing unit 30 can reduce the number of pieces of generated packed data while improving the inference accuracy in the secondary inference. As a result, the information processing device 1 can improve the throughput and the inference speed.

For example, when the positional relationship of the sub-target objects is that "the vehicle front and rear face that is the sub-target object includes the LP that is the target object", the data packing unit 30 discards a BB of the vehicle front and rear face including the LP included in the result of the primary inference among the BBs in the BB of the vehicle front and rear face included in the result of the primary inference. In other words, the data packing unit 30 sets the BB on the vehicle front and rear face in which the LP is not inferred in the region among the BBs on the vehicle front and rear face included in the result of the primary inference as a packing target. In this manner, the data packing unit 30 generates the packed data in such a way as not to include the result of the primary inference in which both the target object and the sub-target object have been inferred.

The positional relationship between the target object and the sub-target object is not limited to the above, and is any relationship. For example, the data packing unit 30 determines the positional relationship between the target object and the sub-target object using the positional relationship set by the operator. In the determination of the positional relationship between the target object and the sub-target object, the data packing unit 30 may use a trained model that determines the positional relationship between the target object and the sub-target object stored in a device (not illustrated) or the like.

The data packing unit 30 may execute an operation different from discarding of the sub-target object. For example, when a target object is detected and a sub-target object related to the target object is detected, the data packing unit 30 may update the confidence of the BB of the target object without discarding the BB of the sub-target object. For example, in a case where a target object is detected and a sub-target object related to the target object is detected, the data packing unit 30 may add or multiply a predetermined value to or by the confidence of the BB of the target object, or may change the value of the confidence to a predetermined value.

The data packing unit 30 may filter the result of the primary inference as post-process before generation of the packed data. The filtering target is any target. For example, the data packing unit 30 may filter the BB as a result of the primary inference by using at least one of the confidence related to the BB, the size or the aspect ratio of the BB, and the position of the BB in the image. More specifically, for example, the data packing unit 30 may filter the BB based on a comparison between a predetermined threshold value and an attribute value of the BB. The attribute value is, for example, a size or an aspect ratio. For example, the data packing unit 30 may discard the BB having a size or an aspect ratio inappropriate for inference. The number of the threshold values is not limited to one, and may be plural. For example, the threshold value may be different for each class related to the BB. Alternatively, the threshold value may be different depending on whether a sub-target object related to the target object has been detected.

Alternatively, the data packing unit 30 may adjust at least one of the acquired size and aspect ratio of the BB. The position and size of the BB included in the result of the primary inference may be different from the correct position and size. For example, the BB size may be smaller than the actual target object. Specifically, in a case where the trained model used in the primary inference is small and lightweight, the inferred BB remarkably tends to be smaller than the actual target object.

When the BB having a size smaller than that of the actual target object is used as it is, the data packing unit 30 generates packed data including a target object partially missing. As a result, the secondary inference unit 40 to be described later performs inference using the packed data including the target object partially missing. As a result, the possibility that the result of the inference in the secondary inference unit 40 will not be a correct result, that is, the possibility that the inference accuracy will be lowered is high. Therefore, as the post-process, the data packing unit 30 may correct the size of the BB by adding a predetermined value to or multiplying a predetermined value by at least one of the height and the width of the BB of the target object and the BB of the sub-target object. Alternatively, in a case where the aspect ratio of the BB deviates from the predetermined range, the data packing unit 30 may correct at least one of the height and the width of the BB in such a way that the aspect ratio falls within the predetermined range. For example, the data packing unit 30 may use a different value as the correction amount of the BB related to at least one of the BB size, the class, the position in the image, and the relative position with respect to a predetermined object in the image. Alternatively, in the case of the BB of the target object, the data packing unit 30 may use a different value as the correction amount of the BB related to whether the sub-target object related to the target object has been detected, the size of the BB of the related sub-target object, or the like. In these cases, the operator may set each value used by the data packing unit 30 in advance.

The data packing unit 30 may not execute the "post-process". However, in both the case of executing the post-process and the case of not executing the post-process, the data packing unit 30 executes the same operation as the packing operation described below. Therefore, in the following description, for convenience of description, the operation described below will be described as an operation "after the post-process" including a case where the post-process is not executed. That is, in a case where the post-process is not executed, the information processing device 1 may operate using the result of the primary inference for which the post-process is not executed as the operation "after the post-process" in the following description.

(3-2) Packing

The data packing unit 30 generates packed data obtained by collecting the regions of the target object and the sub-target object in the result of the post-process primary inference. Specifically, the data packing unit 30 extracts or duplicates the region of the target object and the region of the sub-target object in the result of the primary inference after the post-process in the inference target data, and generates packed data in which the extracted or duplicated regions are collected.

The data packing unit 30 may generate one piece of packed data from a plurality of pieces of inference target data, or may generate a plurality of pieces of packed data from a plurality of pieces of inference target data. However, even in a case where the data is a plurality pieces of data, the number of pieces of the packed data is smaller than the number of pieces of the inference target data. In a case where the inference target data is an image, the data packing unit 30 may provide a predetermined gap between images in the generation of the packed data. As described above, the data packing unit 30 may execute packing without executing the post-process. In this case, the data packing unit 30 executes packing by using the result of the primary inference.

Furthermore, the data packing unit 30 may perform packing after combining at least one of the duplicate result of the primary inference and the adjacent result of the primary inference into one in the result of the primary inference after the post-process in the inference target data and then pack the result. For example, the data packing unit 30 may pack the duplicate BB and the BB within a predetermined distance as the BB including all of the BBs. With such an operation, the information processing device 1 can reduce the possibility of double detection of the same object and the possibility of overlooking the target object in the secondary inference.

The data packing unit 30 may perform packing after changing the sizes of the target object and the sub-target object extracted or duplicated in the result of the primary inference after the post-process. The size change is, for example, enlargement or reduction. When the sizes of the target object and the sub-target object are reduced, the number of pieces of generated packed data is reduced. As a result, the possibility that the time of the secondary inference is shortened, that is, the possibility that the throughput is improved, is high. Conversely, in a case where the sizes of the target object and the sub-target object are increased, the size of the target object or the like in the packed data to be generated, that is, the size of the target object or the like in the secondary inference increases. As a result, the possibility that the inference accuracy of the secondary inference is improved is high.

A method of changing the sizes of the target object and the sub-target object is any method. For example, the data packing unit 30 may determine whether to change the size based on the sizes of the target object and the sub-target object in the result of the primary inference after the post-process and how to change when changed. Alternatively, the data packing unit 30 may determine whether to change the size and how to change the size when changing the size using the result of the primary inference.

The data packing unit 30 may execute the predetermined image process in changing the size. The predetermined image process in this case is, for example, complementary processing. Alternatively, the data packing unit 30 may execute the predetermined image process in addition to or instead of changing the size. The predetermined image process in this case is, for example, brightness adjustment, luminance adjustment, color adjustment, contrast adjustment, geometric correction, or a combination of some or all of these. Furthermore, the data packing unit 30 may adjust parameters related to the image process in accordance with the result of the primary inference.

Further, the data packing unit 30 generates, as the packing correspondence, a correspondence between a region of the target object in the inference target data and a region of the target object in the packed data. The region in this case is, for example, the position, orientation, and size of the BB. In a case of packing the regions of the sub-target objects, similarly for the region of the sub-target object, the data packing unit 30 generates a packing correspondence that is a correspondence between the region of the sub-target object in the inference target data and the region of the sub-target object in the packed data.

(4) Secondary Inference Unit 40

The secondary inference unit 40 infers a target object in the packed data generated by the data packing unit 30. Hereinafter, the inference in the secondary inference unit 40 is referred to as "secondary inference". The secondary inference unit 40 uses machine training in the secondary inference. Specifically, the secondary inference unit 40 infers the target object in the packed data using the trained model stored in the model storage unit 80. Hereinafter, the trained model used by the secondary inference unit 40 is referred to as a "trained model for secondary inference" or a "second trained model". For example, the secondary inference unit 40 infers a set of "BB, class, and confidence" of the target object included in the packed data as a result of secondary inference using the trained model for secondary inference.

The secondary inference unit 40 may change the size of the packed data when applying the packed data to the trained model for secondary inference. For example, in a case where the packed data is an image, the secondary inference unit 40 may change the size or the aspect ratio of the image in the packed data and then apply the changed image to the trained model for secondary inference.

(5) Data Generation Unit 60

The data generation unit 60 generates a training data set used for machine training by using a predetermined data set. Hereinafter, the predetermined data set is referred to as an "original training data set". The data included in the original training data set is any data as long as it is data related to a machine training method. For example, the original training data set is an image group including correct answer data related to the target object. An acquisition source of the original training data set is any source. For example, the operator may store the original training data set in the data storage unit 50 in advance. Alternatively, the data generation unit 60 may acquire the original training data set from a device (not illustrated) in generating the training data set.

Specifically, the data generation unit 60 generates a training data set used in machine training for generating a trained model for primary inference. The trained model for primary inference is used by the primary inference unit 20. Hereinafter, the training data set used in the machine training that generates the trained model for primary inference used by the primary inference unit 20 is referred to as a "primary inference training data set" or a "first training data set". Furthermore, the data generation unit 60 generates a training data set used for machine training that generates a trained model for secondary inference. The trained model for secondary inference is used by the secondary inference unit 40. Hereinafter, the training data set used for machine training that generates a trained model for secondary inference used by the secondary inference unit 40 is referred to as a "secondary inference training data set" or a "second training data set".

For example, the data generation unit 60 generates correct answer data of the target object and the sub-target object based on the correct answer data of the target object included in the original training data set and the information about the positional relationship between the target object and the sub-target object. Then, the data generation unit 60 adds the generated correct answer data to the original training data set to generate a primary inference training data set. For example, the data generation unit 60 generates a BB obtained by multiplying the height and the width of the BB of the LP included in the original training data set by predetermined values and increasing the BB. The BB is correct answer data of the vehicle front and rear face. The data generation unit 60 adds the generated correct answer data of the vehicle front and rear face to the original training data set to generate the primary inference training data set.

Alternatively, the data generation unit 60 applies a predetermined trained model to the original training data set as the correct answer data of the LP to infer the BB of the LP. Then, the data generation unit 60 generates, as correct answer data of the vehicle front and rear face, a BB obtained by multiplying the height and the width of the inferred BB of the LP by predetermined values and increasing the BB. Then, the data generation unit 60 adds the generated correct answer data of the LP and the vehicle front and rear face to the original training data set to generate a primary inference training data set. Alternatively, the data generation unit 60 may apply a predetermined trained model to the original training data set as the correct answer data to infer the BB of the LP and the BB of the vehicle front and rear face, and add the inferred BB to the original training data set to generate the primary inference training data set.

Alternatively, for example, the data generation unit 60 generates the packed data from the correct answer data of the original training data set using the data packing unit 30. Then, the data generation unit 60 adds the correct answer data and the packed data to the original training data set to generate a secondary inference training data set. The data generation unit 60 may generate the secondary inference training data set using the primary inference training data set instead of the original training data set. Alternatively, the data generation unit 60 may generate the secondary inference training data set using a data set obtained by adding the primary inference training data set to the original training data set.

In a case where the primary inference unit 20 and the secondary inference unit 40 use the same trained model, the data generation unit 60 may generate one training data set as the primary inference training data set and the secondary inference training data set. Alternatively, the data generation unit 60 may generate the primary inference training data set and the secondary inference training data set using different original training data sets.

Then, the data generation unit 60 stores the generated primary inference training data set and secondary inference training data set in the data storage unit 50. However, the data generation unit 60 may acquire at least one of the primary inference training data set and the secondary inference training data set from an external device (not illustrated). In this case, the data generation unit 60 stores the acquired primary inference training data set or secondary inference training data set in the data storage unit 50.

(6) Data Storage Unit 50

The data storage unit 50 stores the primary inference training data set and the secondary inference training data set. Furthermore, the data storage unit 50 may store the original training data set. An acquisition source of the original training data set is any source. For example, the operator may store the original training data set in the data storage unit 50 in advance.

The information processing device 1 may use an external storage device (not illustrated) as the data storage unit 50. In this case, the information processing device 1 may not include the data storage unit 50 as a physical configuration. Alternatively, the information processing device 1 may acquire at least one of the primary inference training data set and the secondary inference training data set generated in a device (not illustrated) or the like and store the acquired data in the data storage unit 50. In a case where both the primary inference training data set and the secondary inference training data set are acquired, the information processing device 1 may not include the data generation unit 60.

(7) Model Generation Unit 70

The model generation unit 70 executes machine training using the primary inference training data set stored in the data storage unit 50 on a predetermined model, and generates a trained model for primary inference used by the primary inference unit 20, that is, a first trained model. Furthermore, the model generation unit 70 executes machine training using the secondary inference training data set stored in the data storage unit 50 on the predetermined model, and generates a trained model for secondary inference used by the secondary inference unit 40, that is, a second trained model. The acquisition source of the model used to acquire the trained model is any source. For example, the operator may store the model in the model storage unit 80 in advance. Alternatively, in generating the trained model, the model generation unit 70 may acquire a model used for generating the trained model from a device (not illustrated).

The model generation unit 70 may generate a model having similar a model type, network structure, size, and the like as the trained model for primary inference and the trained model for secondary inference, or may generate different models. For example, the model generation unit 70 may generate the same model as the trained model for primary inference and the trained model for secondary inference. That is, the model generation unit 70 may generate one model as the trained model for primary inference and the trained model for secondary inference. For example, in a case where the primary inference unit 20 and the secondary inference unit 40 use the same trained model, the model generation unit 70 may generate one trained model as the trained model for primary inference and the trained model for secondary inference. Alternatively, the model generation unit 70 may generate, as the trained model for primary inference and the trained model for secondary inference, models that are different from each other but are equivalent in model type, network structure, size, and the like.

Alternatively, the model generation unit 70 may generate, as the trained model for primary inference and the trained model for secondary inference, models in which at least one of a type, a network structure, a size, and the like of the model is different. For example, in a case where both trained models are generated using deep-learning, the model generation unit 70 may generate, as the trained model for primary inference and the trained model for secondary inference, models in which at least one of a type, a network structure, a size, and the like of the model is different. For example, the model generation unit 70 may generate a small and lightweight trained model as the trained model for primary inference, compared with as the trained model for secondary inference. However, this does not limit the trained model generated by the model generation unit 70.

The machine training method used by the model generation unit 70 is any method. For example, the model generation unit 70 may generate at least one of the trained model for primary inference and the trained model for secondary inference using deep-learning. The model generation unit 70 may use the same method as or different methods as the machine training method used for generating the trained model for primary inference and the machine training method used for generating the trained model for secondary inference. In the description of the second example embodiment, as an example, the model generation unit 70 generates different trained models as the primary inference trained model and the secondary inference trained model.

Then, the model generation unit 70 stores the generated trained model for primary inference and trained model for secondary inference in the model storage unit 80. However, the model generation unit 70 may acquire at least one of the trained model for primary inference and the trained model for secondary inference from an external device (not illustrated). In this case, the model generation unit 70 stores the acquired trained model for primary inference or trained model for secondary inference in the model storage unit 80.

(8) Model Storage Unit 80

The model storage unit 80 stores the trained model for primary inference and the trained model for secondary inference. The model storage unit 80 may store a model used by the model generation unit 70 to generate a trained model. For example, the operator may store the model used to generate the trained model in the model storage unit 80 in advance. The information processing device 1 may use an external storage device (not illustrated) as the model storage unit 80. In this case, the information processing device 1 may not include the model storage unit 80 as the physical configuration. Alternatively, the information processing device 1 may acquire at least one of the trained model for primary inference and the trained model for secondary inference from a device (not illustrated) or the like, and store the acquired model in the model storage unit 80. In a case of acquiring both the trained model for primary inference and the trained model for secondary inference, the information processing device 1 may not include the data storage unit 50, the data generation unit 60, and the model generation unit 70.

(9) Object Inference Unit 10

The object inference unit 10 infers the target object in the inference target data using the target object in the packed data that is a result of the secondary inference in the secondary inference unit 40 and the packing correspondence generated by the data packing unit 30 in the generation of the packed data. For example, in a case where the coordinate transformation of the BB is stored as the packing correspondence, the object inference unit 10 applies the inverse transformation of the coordinate transformation to the coordinates of the BB inferred as a result of the secondary inference to calculate the position of the BB of the target object in the inference target data as the inference position of the BB. For example, in a case where the rectangle of the BB obtained as a result of the secondary inference is off the rectangle in the packed data, the object inference unit 10 may discard the BB. Alternatively, for example, in a case where a value obtained by dividing the area of the product set portion of the rectangle of the BB obtained as a result of the secondary inference and the rectangle on the packed data by the area of the rectangle of the BB obtained as a result of the secondary inference is less than a predetermined threshold value, the object inference unit 10 may discard the BB. In a case where the quotient is equal to or more than a predetermined threshold value, the object inference unit 10 may correct the rectangle of the BB to the product set portion.

(A) Operation of Generating Trained Model

Figure 2:
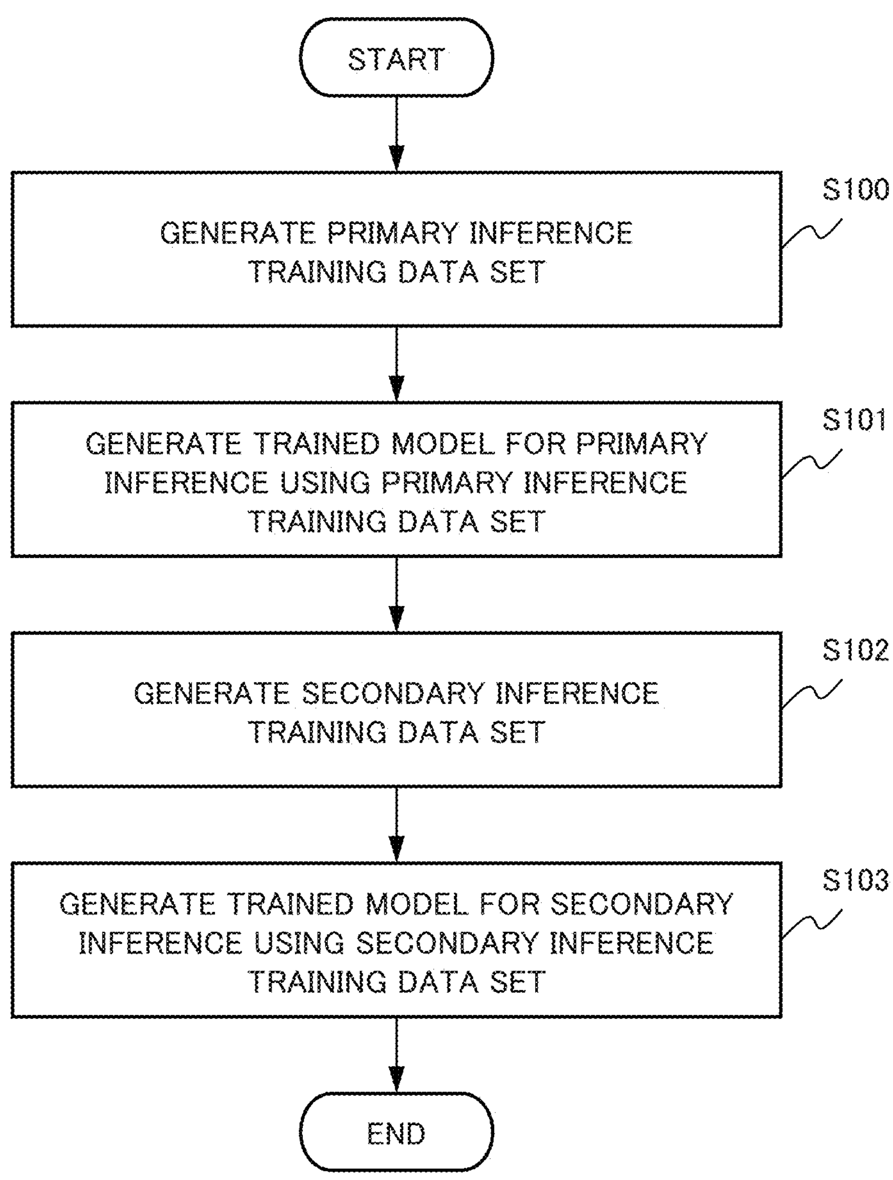
FIG. 2 is a flowchart illustrating an example of an operation of generating a trained model in the information processing device according to the second example embodiment.

FIG. 2 is a flowchart illustrating an example of an operation of generating a trained model in the information processing device 1 according to the second example embodiment. The information processing device 1 starts generation of the trained model in response to a predetermined condition. For example, the information processing device 1 starts generation of the trained model in response to an instruction from the operator. In this case, at the start of the operation, the information processing device 1 may acquire a parameter necessary for generating the trained model from the operator.

The parameter necessary for generating the trained model is any parameter. For example, in a case where the data storage unit 50 stores a plurality of training data sets, the parameter is information indicating which training data set is used. Alternatively, the parameter may be a parameter related to machine training processing in the model generation unit 70. The information processing device 1 may acquire other information in addition to the parameter. For example, the data generation unit 60 may acquire at least part of the training data set from the operator. In this case, the data generation unit 60 stores the acquired training data set in the data storage unit 50.

The data generation unit 60 generates the primary inference training data set using the original training data set stored in the data storage unit 50 (step S100). For example, the data generation unit 60 generates the primary inference training data set using the correct answer data included in the original training data set. Then, the data generation unit 60 stores the primary inference training data set in the data storage unit 50. The model generation unit 70 executes machine training in a predetermined model using the primary inference training data set and generates a trained model for primary inference (step S101). Then, the model generation unit 70 stores the trained model for primary inference in the model storage unit 80.

The data generation unit 60 generates a secondary inference training data set using the original training data set stored in the data storage unit 50 (step S102). For example, the data generation unit 60 may generate the packed data using the correct answer data of the original training data set and generate the secondary inference training data set including the correct answer data and the packed data. Then, the data generation unit 60 stores the generated secondary inference training data set in the data storage unit 50. The model generation unit 70 executes machine training in a predetermined model using the secondary inference training data set and generates a trained model for secondary inference (step S103). Then, the model generation unit 70 stores the trained model for secondary inference in the model storage unit 80. After generating the trained model, the information processing device 1 may notify the operator of the execution result.

(B) Inference Operation

Figure 3:
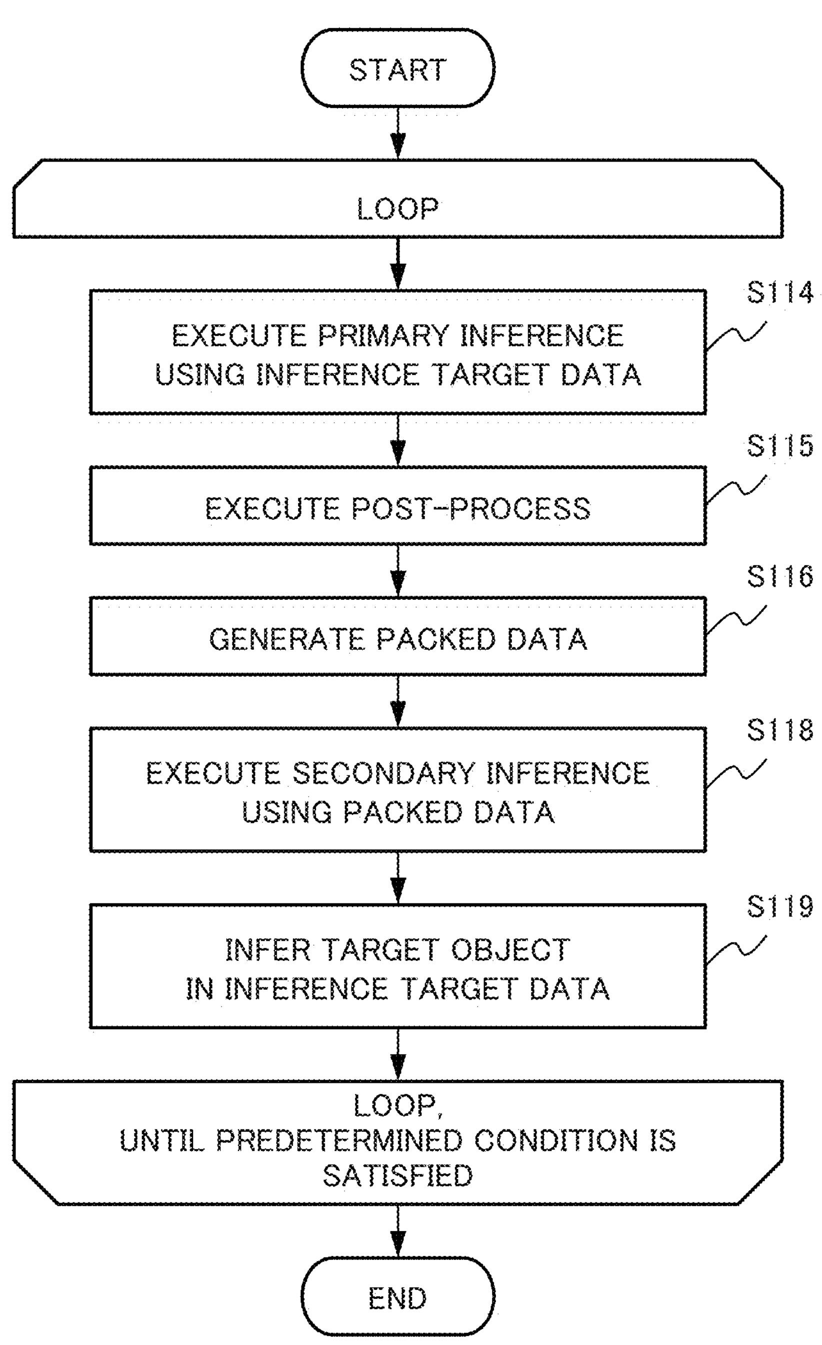
FIG. 3 is a flowchart illustrating an example of an operation of inference of a target object in the information processing device according to the second example embodiment.

FIG. 3 is a flowchart illustrating an example of an operation of inference of a target object in the information processing device 1 according to the second example embodiment. The model storage unit 80 stores the trained model before the inference operation is started. However, in a case where the model storage unit 80 does not store the trained model, the information processing device 1 may start the inference operation after executing the operation of "(A) Generation of trained model" to generate the trained model.

The information processing device 1 starts inference of a target object in response to a predetermined condition. For example, the information processing device 1 starts inference of a target object in response to an instruction from an operator. The information processing device 1 may acquire the parameter from an operator in inference of a target object. The parameter is not limited to the following, but is, for example, designation of a trained model to be used. The information processing device 1 may use a parameter given in advance. Alternatively, the information processing device 1 may automatically start inference of the target object after activation of the device. Alternatively, when the data acquisition unit 90 acquires one or a predetermined number of pieces of inference target data, the information processing device 1 may execute an operation described below. The information processing device 1 may start the inference operation asynchronously with the acquisition of the inference target data in the data acquisition unit 90. The data acquisition unit 90 may acquire inference target data in advance and store the inference target data in a storage unit (not illustrated). In this case, the primary inference unit 20 may acquire the inference target data from the storage unit.

The primary inference unit 20 executes primary inference using the inference target data (step S114). The primary inference unit 20 may execute primary inference by collecting a predetermined number of pieces of inference target data. Hereinafter, a predetermined number of pieces of inference target data on which the primary inference unit 20 collectively executes primary inference is referred to as an "inference target data group". For example, in a case where the inference target data is an image including a target object, the primary inference unit 20 infers sets of "BB, class, and confidence" from an image of a predetermined number of pieces of inference target data (inference target data group) as primary inference. Further, the primary inference unit 20 may infer a sub-target object in the inference target data group.

The primary inference unit 20 may determine an inference target data group to be inferred collectively by using a condition different from the number of pieces of inference target data. For example, the primary inference unit 20 may determine an inference target data group to be inferred collectively by using at least one of the following conditions.

(a) in a case where the number of BBs inferred in the primary inference reaches a predetermined number, (b) in a case where the sum of the sizes of the BB inferred in the primary inference reaches a predetermined value, (c) in a case where the number of packed data is inferred and the inferred number of packed data reaches a predetermined value, (d) inference target data for which a predetermined time has elapsed since acquisition by the information processing device 1

However, the primary inference unit 20 may execute primary inference on all the acquired inference target data. In a case where the primary inference is executed on the inference target data group, the primary inference unit 20 may perform primary inference on at least part of inference target data included in the inference target data group in parallel or sequentially, or may perform processing by combining the parallel processing and the sequential processing.

Figure 5:
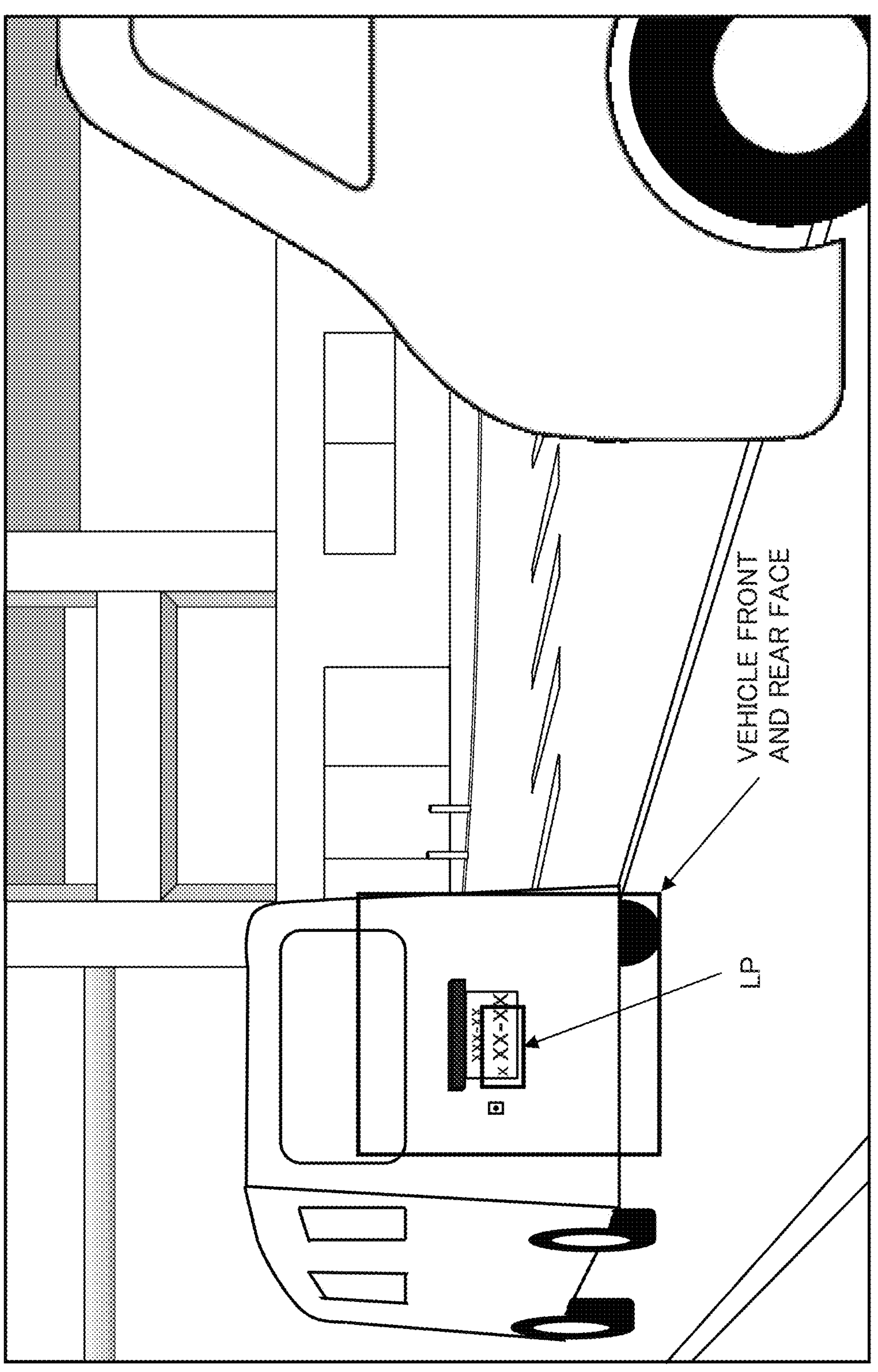
FIG. 5 is a diagram illustrating an example of a result of primary inference.

FIG. 5 is a diagram illustrating an example of a result of the primary inference. In FIG. 5, among the two rectangles, the inner small rectangle is the BB of the LP that is the target object obtained as a result of the primary inference. The outer large rectangle is the BB on the vehicle front and rear face that is the sub-target object obtained as a result of the primary inference. In FIG. 5, the display of the class and the confidence is omitted. The description returns to the description with reference to FIG. 3.

Figure 4:
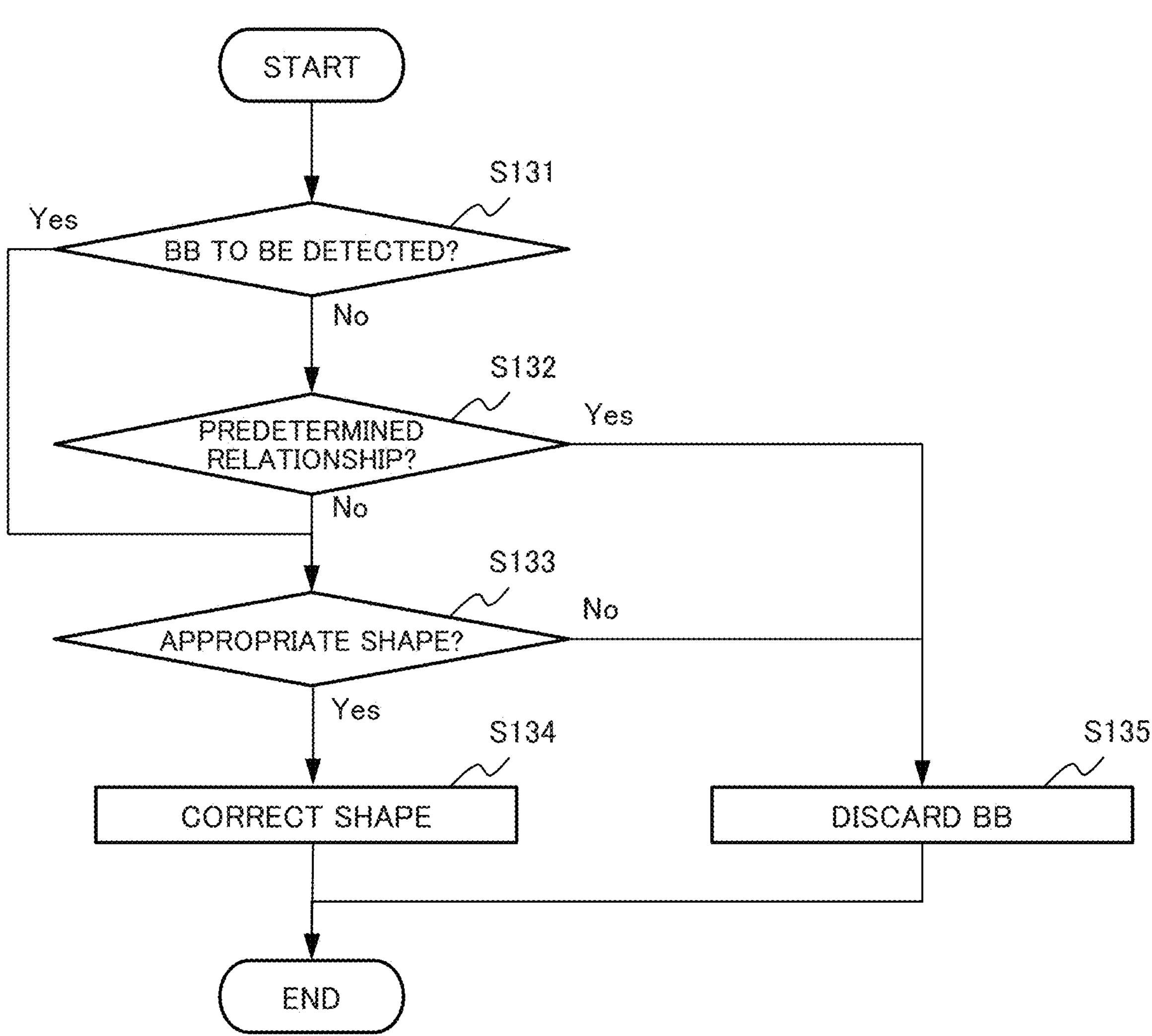
FIG. 4 is a flowchart illustrating an example of a post-process in a data packing unit.

The data packing unit 30 executes a post-process for some or all of the results of the primary inference (step S115). For example, the data packing unit 30 executes filtering and adjustment of the BB by using the attribute of the BB and the information about the positional relationship between the target object and the sub-target object. FIG. 4 is a flowchart illustrating an example of the post-process in the data packing unit 30. More specifically, FIG. 4 is an example of an operation of the post-process in the data packing unit 30 in a case where the BB is inferred as a result of the primary inference. Hereinafter, an operation in a case where the target object is the LP and the sub-target object is the vehicle front and rear face including the LP will be described with reference to FIG. 4.

The data packing unit 30 determines whether the BB is a BB of the target object (step S131). The case where the BB is not the BB of the target object is a case where the BB is a BB of the sub-target object. When the BB is not the BB of the target object (No in step S131), the data packing unit 30 determines whether the sub-target object has a predetermined relationship with the target object included in the result of the primary inference (step S132). For example, the data packing unit 30 determines whether the BB of the sub-target object includes the BB of the target object included in the result of the primary inference. In a case where the BB is the BB of the target object (Yes in step S131) or in a case where the sub-target objects do not have the predetermined relationship (No in step S132), the data packing unit 30 determines whether the BB has a shape appropriate for use as the packed data (step S133). For example, the data packing unit 30 determines whether the size and aspect ratio of the BB are within predetermined threshold value ranges.

When the BB has an appropriate shape (Yes in step S133), the data packing unit 30 corrects the BB to a shape appropriate for generating the packed data (step S134). For example, the data packing unit 30 sets the size and aspect ratio of the BB to values appropriate for generating the packed data. For example, the data packing unit 30 may change the size of the BB by multiplying the height and the width of the BB by a predetermined value. Alternatively, the data packing unit 30 may correct the height and width of the BB in such a way that the aspect ratio of the BB falls within a predetermined range. When the sub-target objects have the predetermined relationship (Yes in step S132) or when the BB does not have an appropriate shape (NO in step S133), the data packing unit 30 discards the BB (step S135). That is, the data packing unit 30 does not include the BB in the packed data. In this manner, the data packing unit 30 executes a post-process on the result of the primary inference. The description returns to the description with reference to FIG. 3.

The data packing unit 30 generates packed data by using all the results of the primary inference after the post-process (step S116). For example, in a case where the inference target data is an image, the data packing unit 30 generates an image obtained by collecting images of the region of the target object and the region of the sub-target object inferred as a result of the primary inference. In the result of the primary inference, the data packing unit 30 may generate the packed data by using a region obtained by combining at least part of the duplicate region and the neighboring region into one.

Figure 6:
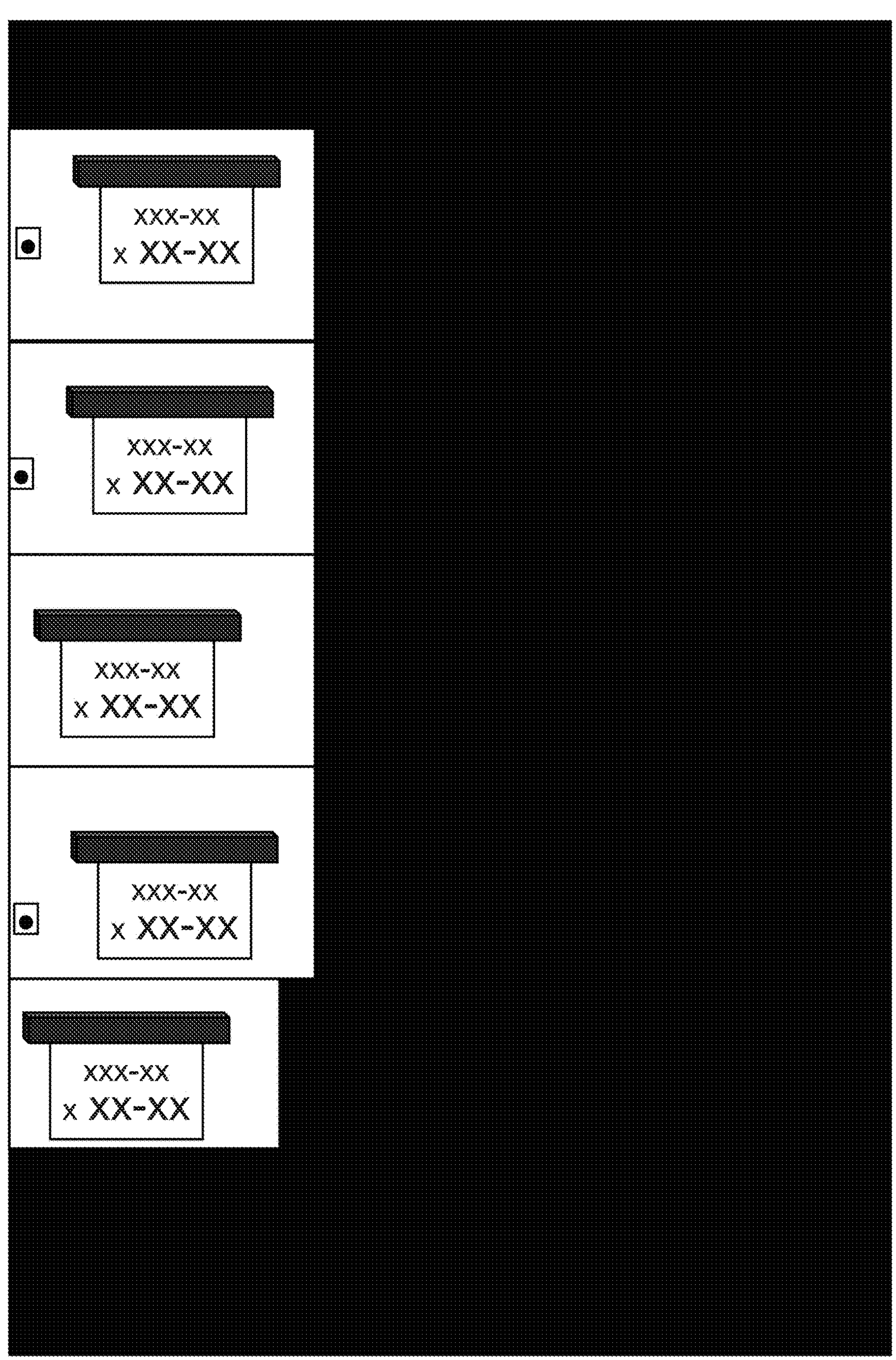
FIG. 6 is a diagram illustrating an example of packed data.

FIG. 6 is a diagram illustrating an example of packed data. In FIG. 6, the display of the class and the confidence is omitted. The packed data of FIG. 6 is an example of packed data generated using a total of five pieces of data of the data of FIG. 5 and four pieces of data temporally before and after FIG. 5. Furthermore, the packed data of FIG. 6 is an example of a case where the LP is detected in any data in the primary inference for the five pieces of data. When the vehicle front and rear face are detected without detecting the LP in any data and, the image related to the data is not the image of the LP but the vehicle front and rear face. In the example of FIG. 6, the data packing unit 30 makes the region of the image to be extracted larger than the region of the BB of the result of the primary inference in order to reduce the possibility that part of the target object is missing. For example, the image of each LP is an image of a region larger than the BB of the LP. In the example illustrated in FIG. 6, the total area of the images as a result of the primary inference is smaller than the area of the image of the packed data. Therefore, the image of the packed data in FIG. 6 includes a surplus region. The black region on the right side of FIG. 6 is a surplus region. For example, in a case of further packing the results of the primary inference, the data packing unit 30 may add at least part of the result of the primary inference to be packed to the surplus region. In a case where the result of the primary inference to be added cannot be completely accommodated the surplus region, the data packing unit 30 may generate new packed data. The sub-target object in FIG. 5 includes the target object included in the result of the primary inference. That is, the sub-target object in FIG. 5 is a sub-target object having a predetermined positional relationship with the target object. Therefore, the BB of the sub-target object in FIG. 5 is not included in the packed data in FIG. 6. The description returns to the description with reference to FIG. 3.

Figure 7:
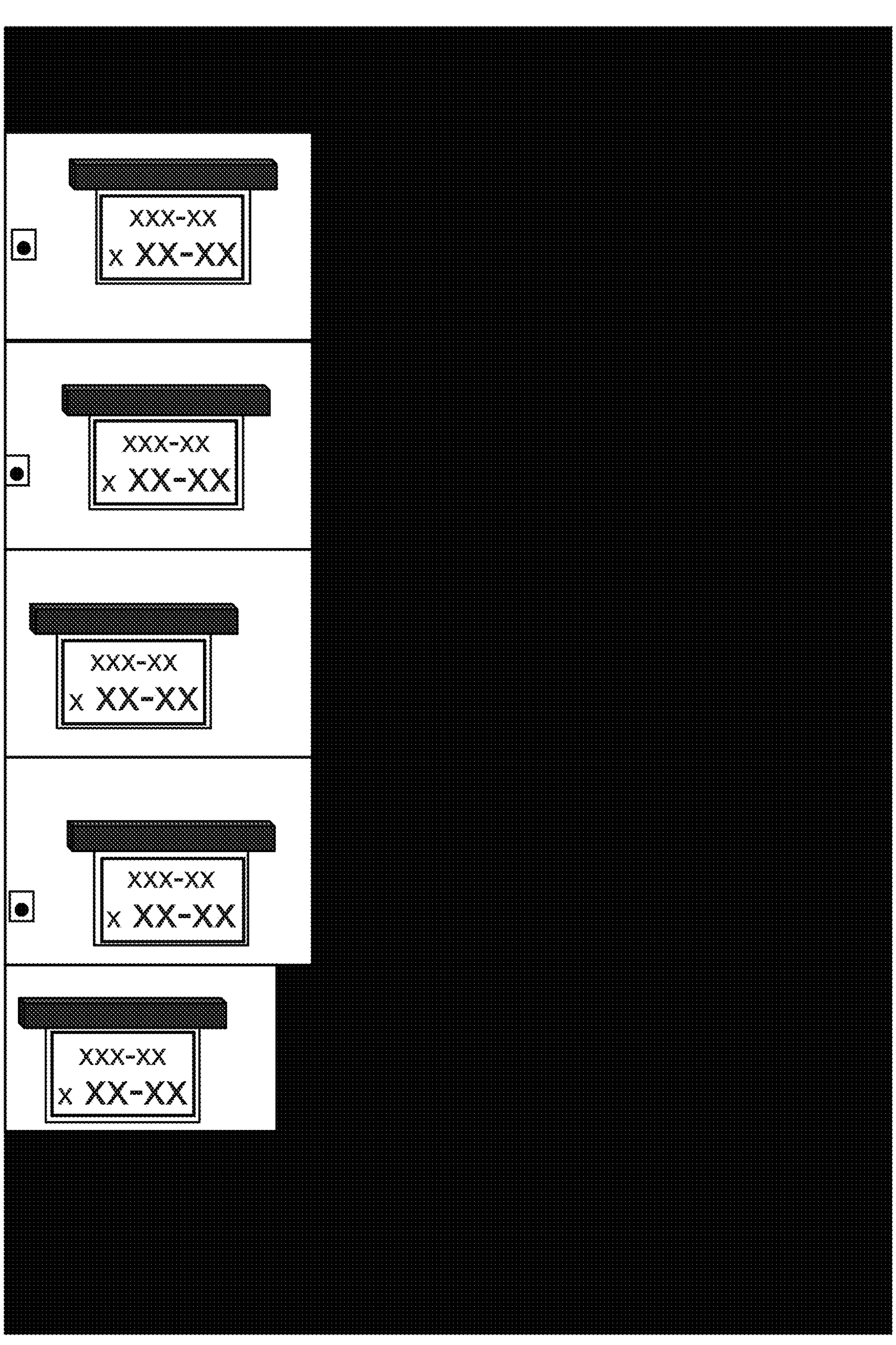
FIG. 7 is a diagram illustrating an example of a result of secondary inference.

Further, in the generation of the packed data, the data packing unit 30 generates a packing correspondence that is a correspondence between the positions of the data regions of the target object and the sub-target object included in the inference target data and the positions of the data regions of the target object and the sub-target object in the packed data. The secondary inference unit 40 executes secondary inference using the packed data (step S118). FIG. 7 is a diagram illustrating an example of a result of secondary inference. A rectangle in FIG. 7 is the BB of the LP of the target object inferred by the secondary inference unit 40. In FIG. 7, the display of the class and the confidence is omitted. The description returns to the description with reference to FIG. 3.

Figure 8:
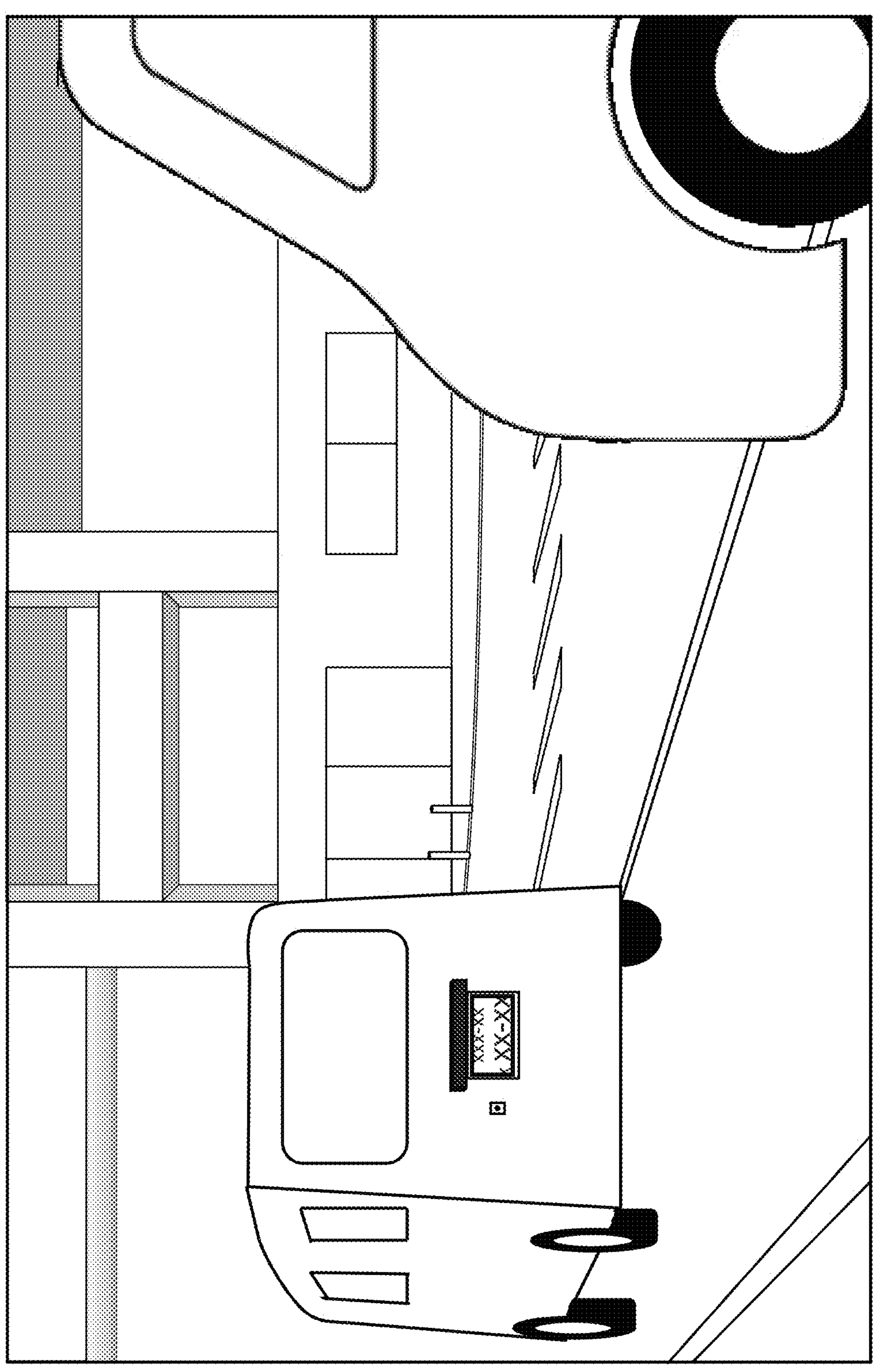
FIG. 8 is a diagram illustrating an example of inference of a target object in inference target data.

The object inference unit 10 infers the target object in the inference target data using the result of the secondary inference and the packing correspondence (step S119). FIG. 8 is a diagram illustrating an example of inference of a target object in inference target data. The position of the BB in FIG. 8 is an appropriate position with respect to the LP, compared with that in FIG. 5. In a case where the size of the target object included in the result of the secondary inference is larger than the size of the data packed in the packed data, the object inference unit 10 may ignore the target object. The description returns to the description with reference to FIG. 3.

The information processing device 1 repeats the above operation until a predetermined condition is satisfied. For example, the information processing device 1 may terminate the operation when acquiring an instruction of termination from the operator. Alternatively, the information processing device 1 may repeat the above operation until there is no inference target data to be processed, until the number of pieces of processed inference target data reaches a predetermined value, until a predetermined time elapses, or until the number of repetitions reaches a predetermined number. Based on the above operation, the information processing device 1 infers a target object in the inference target data.

As described above, the packed data is data obtained by collecting the region of the target object in the inference target data, and is data having a smaller amount than the inference target data. Therefore, the load of the secondary inference is lower than the load in a case where all the inference target data is used. The primary inference is only required to be able to infer the target object with a certain degree of accuracy. That is, the information processing device 1 can use inference with a low load as the primary inference, compared with as the secondary inference. As a result, the information processing device 1 can improve the throughput in inference.

Improvement in inference throughput in the information processing device 1 will be described using a specific example. As inference to be compared with that in the information processing device 1, inference in which a model equivalent to the trained model for secondary inference is applied to inference target data is used. Hereinafter, the inference to which the equivalent model is applied is referred to as "related inference". In the following description, the following is assumed as a premise.

(1) The inference target data is an image.

(2) The performance and scale of the related inference are the same as the performance and scale of the secondary inference in the secondary inference unit 40. The time required for the related inference and the secondary inference to infer one image is a unit time. Hereinafter, the unit time is "1".

(3) The time required for the primary inference in the primary inference unit 20 to infer one image is 1/10 (0.1) of the related inference and the secondary inference.

(4) The data packing unit 30 generates one packed image from three images to be inferred on average. That is, the ratio between the number of images to be inferred and the number of images as the packing unit result is 3:1.

(5) The total number of images is N.

(6) Processing other than inference is ignored because the processing time is shorter than that of inference.

In this case, the inference time of the related inference is "N×1=N". The inference time of the primary inference in the information processing device 1 is "N×0.1=0.1N". The inference time of the secondary inference is "N/3×1=N/3". That is, the inference time of the information processing device 1 is "about 0.43N (=0.1N+N/3)". In this manner, the information processing device 1 can perform inference in a shorter time than the related inference. As a result, the information processing device 1 can improve the throughput, compared with the related inference. The scale of the trained model for secondary inference used for the secondary inference that is the final inference in the information processing device 1 is equivalent to that of the model used for related inference. Therefore, the accuracy of inference of the information processing device 1 is equivalent to the accuracy of the related inference.

The light weight model tends to have high speed but low accuracy, compared with the heavy weight model. For example, in the above example, the accuracy of the primary inference in the primary inference unit 20 tends to be lower than the accuracy of the secondary inference in the secondary inference unit 40. Therefore, the primary inference unit 20 may infer a second target object having a predetermined positional relationship with the first target object. In this case, the data packing unit 30 may generate the packed data and the correspondence by using the first target object and the second target object. By using the above operation, the information processing device 1 can execute inference using not only the target object to be inferred in the information processing device 1 but also a sub-target object having a predetermined relationship with the target object. Therefore, the information processing device 1 can improve the accuracy of inference. For example, the information processing device 1 can suppress overlooking of the target object.

Further, the data packing unit 30 may use, among the second target objects included in the result of the primary inference, the second target objects in which the first target object in the predetermined positional relationship is not included in the result of the primary inference. By using the above operation, the information processing device 1 can reduce the size of the packed data. As a result, the information processing device 1 can improve the throughput. Further, the data packing unit 30 may perform the predetermined process such as the post-process on at least part of the first target object included in the result of the primary inference before generating the packed data. By using the above operation, the information processing device 1 can generate more appropriate packed data. As a result, the information processing device 1 improves the inference accuracy. For example, the information processing device 1 suppresses overlooking of the target object. In a case where the sub-target object is used, the information processing device 1 may execute the predetermined process on at least part of the second target object included in the result of the primary inference before generating the packed data.

The data packing unit 30 corrects the size of the BB by adding a predetermined value to or multiplying a predetermined value by at least one of the height and the width of the BB of the target object and the height and the width of the BB of the sub-target object. However, the second example embodiment is not limited thereto. As another example, the data packing unit 30 may correct the size of the BB by multiplying a predetermined value by at least one of the height and the width of the BB of the target object and the height and the width of the BB of the sub-target object and then adding a predetermined value. Alternatively, the data packing unit 30 may correct the size of the BB by applying predetermined linear or nonlinear conversion to at least one of the height and the width of the BB of the target object and the height and the width of the BB of the sub-target object. The parameter related to the conversion in this case may be given to the data packing unit 30 in advance, for example. Alternatively, the data packing unit 30 may switch the conversion method and the parameter related to the conversion based on the attributes of the BB and the inference target data or other information. The other information is not limited to the following, but is, for example, a load of the information processing device 1.

In the above description, an example of a case where there is one primary inference unit 20 and one secondary inference unit 40 is described. However, the configuration of the information processing device 1 is not limited thereto. For example, the information processing device 1 may include a plurality of primary inference units 20. In this case, the plurality of primary inference units 20 may perform inference using different parameters. The parameter is, for example, a trained model, a size of data, or a class to be recognized. Furthermore, all of the plurality of primary inference units 20 may perform inference using the same inference target data. Alternatively, at least some of the primary inference units 20 may perform inference using inference target data different from the other primary inference units 20.

Alternatively, for example, the information processing device 1 may include two or more secondary inference unit 40. In a case where there is a plurality of secondary inference units 40, at least some of the secondary inference units 40 may perform inference using the parameter different from parameters of the other secondary inference units 40. The parameter in this case is, for example, a trained model or a size of data. In a case where there is a plurality of secondary inference units 40, the data packing unit 30 may generate packed data related to each secondary inference unit 40. In a case where the packed data related to each of the plurality of secondary inference units 40 is generated, the data packing unit 30 may generate the packed data using a different parameter for each of the secondary inference units 40.

Alternatively, the data packing unit 30 may divide the result of the primary inference to generate packed data, or divide the generated packed data to allocate the packed data to the plurality of secondary inference units 40. In the case of distributing the data to the plurality of secondary inference units 40, the data packing unit 30 may generate or divide the packed data using, for example, the attribute of the BB in the result of the primary inference described below or a combination of these attributes. The case where the data packing unit 30 distributes the packed data to the plurality of secondary inference units 40 is either a case where the data packing unit 30 generates the packed data related to each of the plurality of secondary inference units 40 or a case where the data packing unit 30 divides the generated packed data.

(1) a size or an aspect ratio of the BB,
(2) a class of the BB,
(3) confidence of the BB,
(4) a position in the result of the primary inference of the BB,
(5) when the BB is a BB of the target object, whether the related sub-target object has been detected The data packing unit 30 may include part of the result of the primary inference in a plurality of pieces of generated packed data or a plurality of pieces of divided packed data. The data packing unit 30 may use the above-described attribute or a combination thereof as a determination as to whether to include the result of the primary inference in the plurality of packed data. In a case where the result of the primary inference is included in the plurality of packed data, there is a possibility that the plurality of secondary inference units 40 infer the same target object. In this case, the object inference unit 10 may determine the duplicate of the target object using the result of the secondary inference and the packing correspondence, and execute the operation related to the duplicate using the determination result. For example, the object inference unit 10 may correct the result of inference using the duplicate. For example, the object inference unit 10 may select a BB having the highest confidence among a plurality of BBs for the target object that have been inferred in duplicate as the BB of the target object. Alternatively, the object inference unit 10 may average the rectangular information about the BB in the result of a plurality of pieces of inference as the rectangular information about the BB of the target object. The object inference unit 10 may use a weighted average based on confidence as the averaging.

The accuracy of the inference result depends on the inference difficulty level for the input data. In a case of data having a low inference difficulty level, even a trained model having a low inference accuracy can be inferred with high accuracy in many cases. The trained model having low inference accuracy is, for example, a model that has a lightweight, a high-speed, or a low in processing load. On the other hand, in the case of data having a high inference difficulty level, it is difficult to achieve high inference accuracy if a trained model having a low inference accuracy is used. In order to achieve sufficient inference accuracy, it is necessary to use an inference model with high inference accuracy. The inference model with high inference accuracy is a model with a high processing load. Therefore, it is expected to achieve both the inference speed and the inference accuracy by selectively using the trained model used for inference in accordance with the characteristics of the inference target data such as the inference difficulty level. The same applies to inference parameters such as the size of a convolutional neural network (CNN), for example.

Therefore, the information processing device 1 may classify the inference target data or the result of the primary inference into a plurality of groups based on characteristics such as the inference difficulty level, and execute secondary inference on each of the classified groups. Such a case will be described below. In the following description, a posture estimation task using a keypoint is used as a task to be executed. However, this does not limit the present example embodiment. For example, in the following description, the present example embodiment may be used for another task such as an object detection task instead of the posture estimation task. The characteristics used for classification are not limited to the inference difficulty level, and may be other characteristics.

Figure 14:
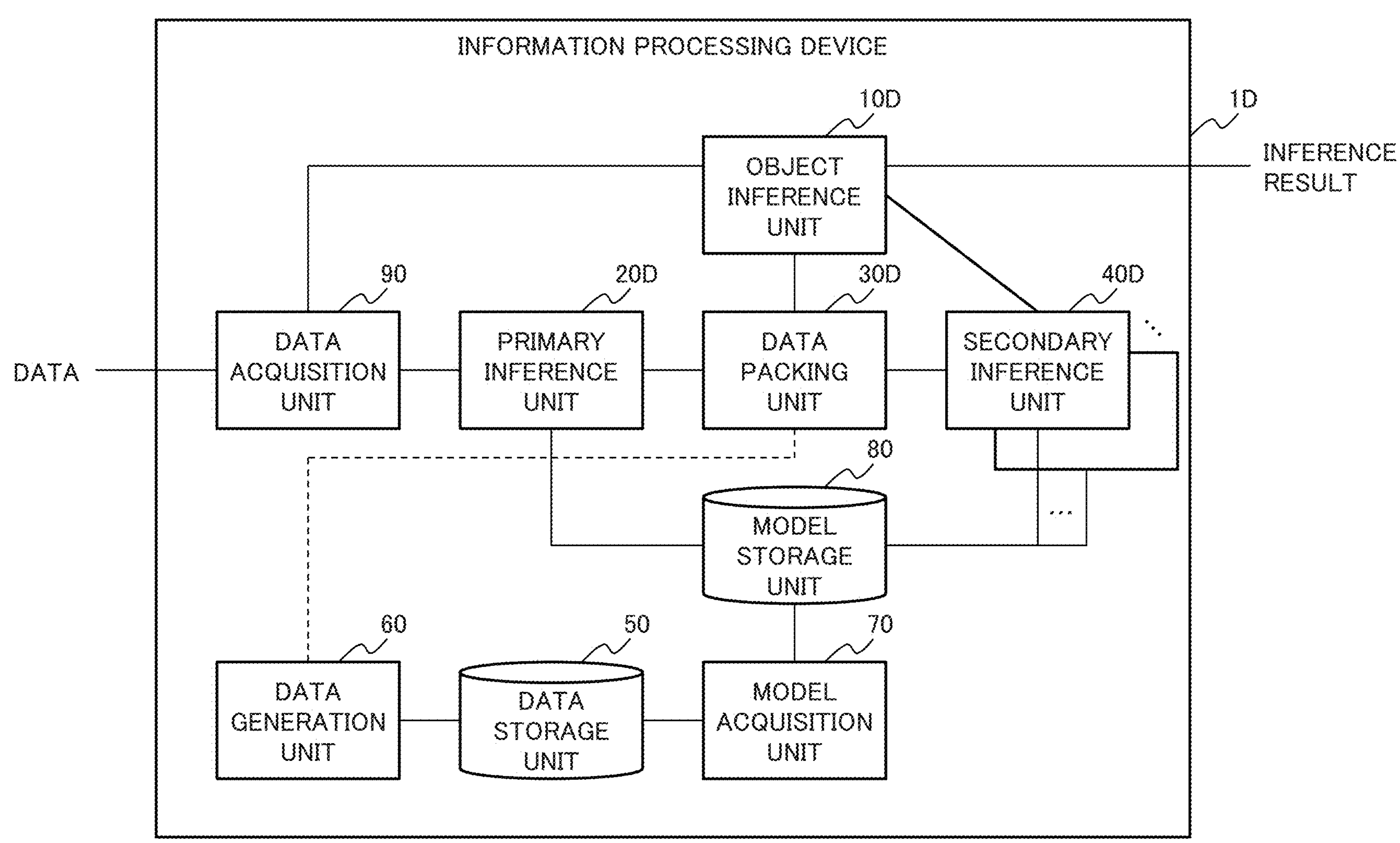
FIG. 14 is a block diagram illustrating an example of a configuration of an information processing device that executes secondary inference for each group according to the second example embodiment.

FIG. 14 is a block diagram illustrating an example of a configuration of an information processing device 1D that executes secondary inference for each group. The information processing device 1D includes the object inference unit 10D, the primary inference unit 20D, the data packing unit 30D, a plurality of secondary inference units 40D, the data storage unit 50, the data generation unit 60, the model generation unit 70, the model storage unit 80, and the data acquisition unit 90. The data storage unit 50, the data generation unit 60, the model generation unit 70, the model storage unit 80, and the data acquisition unit 90 are similar to those of the information processing device 1 except that there is a plurality of secondary inference units 40D, and thus detailed description thereof will be omitted.

As in the object inference unit 10, the object inference unit 10D infers the posture of the target object in the inference target data using the results of the secondary inference in the secondary inference units 40D and the packing correspondence generated by the data packing unit 30D in generation of the packed data. More specifically, in the present case, the object inference unit 10D infers the posture of the target object based on the results of the keypoint extraction processes of the posture estimation tasks that are the results of the secondary inference in the secondary inference units 40D. For example, in a case where the coordinate transformation of the BB is acquired as the packing correspondence, the object inference unit 10D applies the inverse transformation of the coordinate transformation to the coordinates of each keypoint inferred as a result of the secondary inference to calculate the coordinates of keypoint in the inference target data.

The primary inference unit 20D executes primary inference as in the primary inference unit 20. However, in the present case, as an example, the primary inference unit 20D executes the keypoint extraction process as the posture detection task. For example, the primary inference unit 20D outputs the coordinates of each keypoint, the class, and the confidence included in the inference target data as the inference result. The class is, for example, but not limited to, an eye or a nose. Furthermore, the primary inference unit 20D may execute processing of generating a posture as the posture detection task.

The secondary inference units 40D execute secondary inference as in the secondary inference unit 40. For example, in the present case, the secondary inference units 40D execute the keypoint extraction process as the posture detection task, as in the primary inference unit 20D. For example, the secondary inference units 40D output the coordinates of each keypoint, the class, and the confidence included in the inference target data as the inference result. The class is, for example, but not limited to, an eye or a nose. Furthermore, the secondary inference units 40D may execute processing of generating a posture as the posture detection tasks. However, the secondary inference units 40D execute secondary inference on packed data of the groups different to each other.

The secondary inference units 40D may use the same trained model or may use the trained models different to each other. The same applies to the inference parameter. In the following description, it is assumed that the information processing device 1D includes two secondary inference units 40D as an example. In a case where the two secondary inference units 40D are distinguished, they are referred to as a secondary inference unit 40D-1 and a secondary inference unit 40D-2. For convenience of description, in the following description, the secondary inference unit 40D-1 uses a model with higher accuracy than a model used by the secondary inference unit 40D-2. In other words, the secondary inference unit 40D-2 uses a model with lower accuracy but higher speed than the secondary inference unit 40D-1. The secondary inference unit 40D uses packed data of the groups different to each other. Therefore, the information processing device 1D may include any number of secondary inference units 40D as long as the number is larger than the number of packed data generated by the data packing unit 30D, that is, the number of groups. For example, in a case where the number of secondary inference units 40D is larger than the number of groups, some of the secondary inference units 40D may execute secondary inference using different trained models for the same packed data.

The data packing unit 30D classifies the first target objects inferred in the primary inference into any one of groups based on the attribute of the first target object. Then, the data packing unit 30D generates packed data that is data having a smaller amount than the inference target data for each group. Then, the data packing unit 30D generates, for each packed data, a correspondence between the position of the first target object in the inference target data and the position of the first target object in the packed data.

For example, the data packing unit 30D estimates the BB as the attribute of the first target object based on the result of the keypoint extraction process of the primary inference. An example of estimation of the BB in the data packing unit 30D will be described. For each keypoint, the data packing unit 30D regards coordinates obtained as a result of the primary inference as a 1×1 rectangle, and estimates the BB related to the keypoint. However, the data packing unit 30D may estimate a BB different from this. Furthermore, the data packing unit 30D may combine duplicate or adjacent BBs into one BB. The data packing unit 30D may use, for example, comparison between a predetermined threshold value and a distance between BBs as the determination of whether they are close to each other. The data packing unit 30D may perform the process for each class of the result of the primary inference or across a plurality of classes. The data packing unit 30D may use a different threshold value as threshold values used for determination for each class. For example, the data packing unit 30D may use a different threshold value related to the result of the primary inference or the attribute of the BB. The attribute of the BB is, for example, the size of the BB, the position of the BB, the number of keypoints included in the BB, or the class of the BB.

Then, the data packing unit 30D classifies the results of the primary inference into groups using the estimated BB, and executes "data packing" including "post-process" and "packing" for each group. The operation of data packing is similar to that of the data packing unit 30. For example, in the present case, the data packing unit 30D classifies the results of the primary inference into two groups of the secondary inference unit 40D-1 and the secondary inference unit 40D-2 by using the estimated attribute information of the BB. The data packing unit 30D may perform the classification before the post-process, in the middle of the post-process, or after the post-process. That is, the data packing unit 30D may execute the post-process and the classification in any order or in parallel. Then, the data packing unit 30D generates packed data for the result of the primary inference classified into the same group. The data packing unit 30D may classify target objects of all classes as target objects to be classified into groups, or may classify target objects of some classes and sub-target objects of target objects of another class.

For example, the data packing unit 30D may operate as follows. The accuracy of processing of the model of the secondary inference unit 40D-1 is higher than that of the secondary inference unit 40D-2. Therefore, the data packing unit 30D may estimate the inference difficulty level in the secondary inference of each BB and classify the BBs into groups based on the result. For example, the data packing unit 30D classifies a BB having a high inference difficulty level into a group of the secondary inference unit 40D-1, and classifies a BB having a low inference difficulty level into a group of the secondary inference unit 40D-2. However, the classification of the data packing unit 30D is not limited thereto. For example, the data packing unit 30D may perform classification based on the size of the BB or may perform classification based on the confidence of the BB. For example, the data packing unit 30D may classify a BB having a small size or a BB having low confidence into a group of the secondary inference unit 40D-1, and classify a BB having a large size or a BB having high confidence into a group of the secondary inference unit 40D-2. However, the data packing unit 30D is not limited to the rule-based classification as described above, and may execute classification based on machine training including deep-learning.

Next, an example of estimation of the inference difficulty level in the secondary inference in the data packing unit 30D will be described. For example, the data packing unit 30D may estimate that the BB including only the upright posture has a low inference difficulty level, and may estimate that the BB including a posture other than the upright posture has a high inference difficulty level. As a determination of the estimation, for example, the data packing unit 30D may estimate that the posture is the upright posture when the aspect ratio of the rectangle of the BB or the circumscribed rectangle of the keypoint group included in the BB is within a predetermined range. Furthermore, the data packing unit 30D may estimate the number of postures in the BB and perform estimation based on the aspect ratio in a case where there is one posture. In this case, for example, the data packing unit 30D may set the maximum value of the number of keypoints included in the BB packed for each class as the estimation value of the number of postures. Alternatively, the data packing unit 30D may sets, as the estimation value, a value obtained by excluding the maximum value and the minimum value of the keypoint, or a value obtained by performing statistical processing such as an average value. The data packing unit 30D may estimate the number of postures by prioritizing classes. The data packing unit 30D may further estimate the number of postures using confidence of the keypoint. Alternatively, in a case where the object inference unit 10D executes posture generation processing of the posture estimation task, the data packing unit 30D may acquire a result of the posture generation processing and estimate the number of postures using the result.

Alternatively, the data packing unit 30D may estimate that the inference difficulty level is low when the size or area of the BB is larger than a predetermined value. Alternatively, the data packing unit 30D may estimate the number of postures in the BB and estimate that the inference difficulty level is low when a value obtained by dividing the size of the BB by the number of estimated postures or the square of the number of estimated postures is larger than a predetermined value. In a case where this estimation is used, the data packing unit 30D can avoid estimating that the inference difficulty level of the BB whose number of included postures is small but that has a large size is low.

In changing the sizes of the target object and the sub-target object at the time of packing, the data packing unit 30D may determine at least one of whether to apply size change, a size change method, and a size change parameter by using the classification result and the information generated in the course of the classification processing. The information generated in the course of the classification process is, for example, the inference difficulty level in the secondary inference, whether the posture is an upright posture, the number of estimated postures, or the height and width of the BB.

Figure 15:
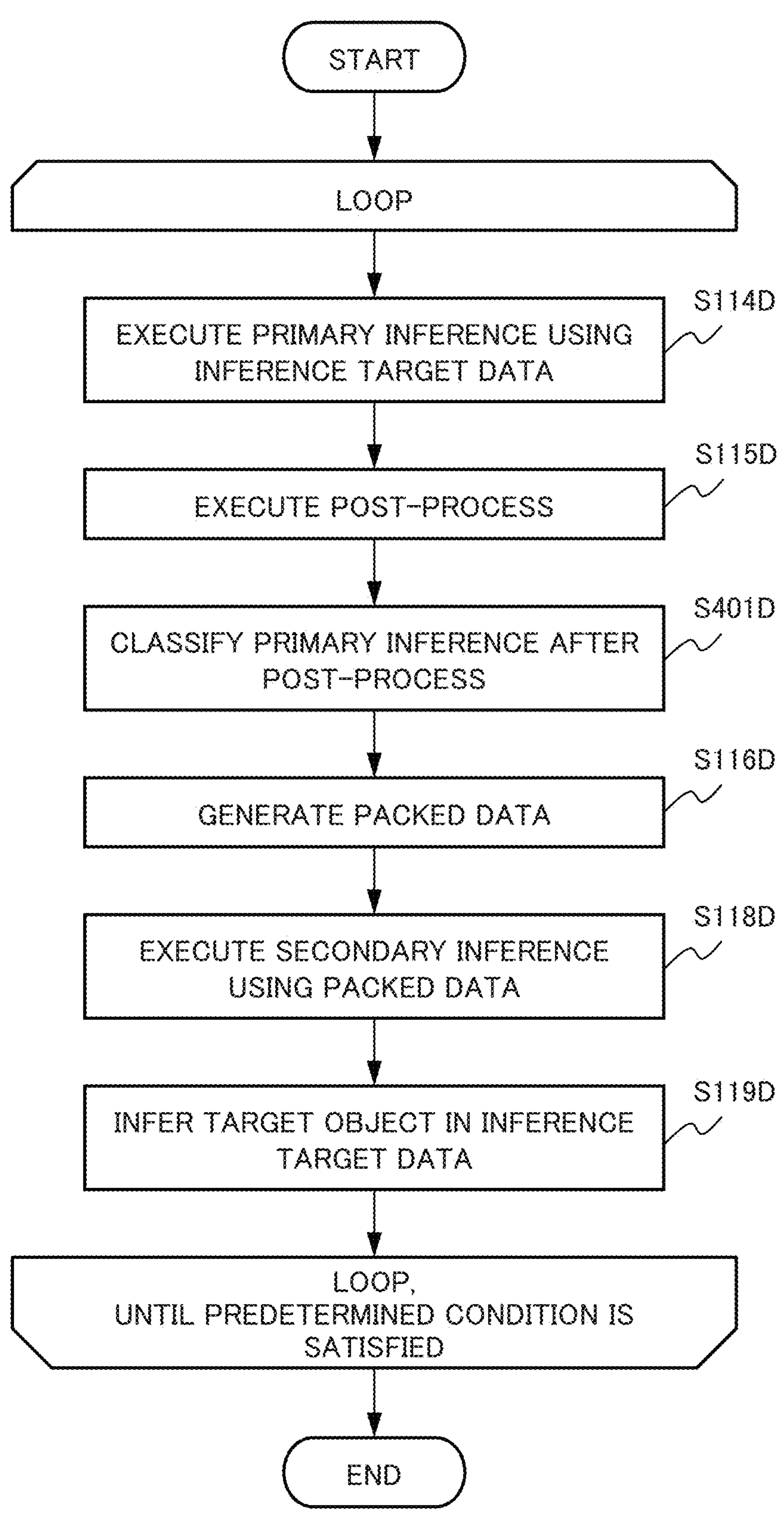
FIG. 15 is a flowchart illustrating an example of an operation of inference of a target object in the information processing device of FIG. 14.

Next, the operation of the information processing device 1D will be described with reference to the drawings. FIG. 15 is a flowchart illustrating an example of an operation of inference of a target object in the information processing device 1D of FIG. 14. The primary inference unit 20D executes primary inference using the inference target data, as in step S114 of FIG. 3 (step S114D). However, in the present case, the primary inference unit 20D executes the posture estimation task inference process. The data packing unit 30D executes a post-process on some or all of the results of the primary inference, as in step S115 of FIG. 3 (step S115D). However, in the present case, the data packing unit 30D estimates the BB from the result of the primary inference in addition to the operation of step S115. The data packing unit 30D classifies the result of the primary inference after the post-process (step S401D). For example, the data packing unit 30D estimates the inference difficulty level in the secondary inference for the result of the primary inference after the post-process, and classifies the result of the primary inference after the post-process based on the inference difficulty level. For example, the data packing unit 30D classifies the result of the primary inference having a high inference difficulty level into a group for the secondary inference unit 40D-1, and classifies the result of the primary inference having a low inference difficulty level into a group for the secondary inference unit 40D-2. The data packing unit 30D may execute classification before or in the middle of the post-process.

Then, the data packing unit 30D generates the packed data using all the results of the primary inference after the post-process, as in step S116 of FIG. 3 (step S116D). However, the data packing unit 30D generates packed data for each of the classified groups. For example, the data packing unit 30D generates the packed data for the secondary inference unit 40D-1 and the packed data for the secondary inference unit 40D-2 based on the classification result of step S401D. The secondary inference unit 40D-1 and the secondary inference unit 40D-2 each execute secondary inference using the packed data, as in step S118 of FIG. 3 (step S118D). In this case, the secondary inference unit 40D-1 and the secondary inference unit 40D-2 perform the posture estimation task inference process using the packed data of the groups different to each other. Then, the object inference unit 10D infers the target object in the inference target data using the results of the secondary inference and the packing correspondence, as in step S119 in FIG. 3 (step S119D). However, in the present case, the object inference unit 10D executes the posture estimation task using the inference results by the secondary inference unit 40D-1 and the secondary inference unit 40D-2.

As described above, the information processing device 1D includes the object inference unit 10D, the primary inference unit 20D, the data packing unit 30D, and the plurality of secondary inference units 40D. The primary inference unit 20D applies inference target data at least part of which includes the first target object to the first trained model to infer, as the primary inference, the first target object. The data packing unit 30D classifies the first target objects inferred in the primary inference into any one of groups based on the attribute of the first target object. Then, the data packing unit 30D generates packed data that is data having a smaller amount than the inference target data for each group. Further, the data packing unit 30D generates a packing correspondence that is a correspondence between the position of the first target object in the inference target data and the position of the first target object in the packed data. The secondary inference units 40D apply the packed data of the groups different to each other to the second trained model to infer, as the secondary inference, the first target object. The object inference unit 10D infers the first target object in the inference target data using the first target object in the results of the secondary inference and the packing correspondence that is a correspondence.

As described above, the information processing device 1D includes the plurality of secondary inference units 40D. Then, the data packing unit 30D classifies the results of the primary inference into groups based on the attribute of the first target object such as the inference difficulty level in the secondary inference. Then, the data packing unit 30D generates packed data for each group. Then, the plurality of secondary inference units 40D executes secondary inference using the packed data for each group. Therefore, for example, for a group having a low inference difficulty level, the information processing device 1D can improve the inference speed while maintaining the accuracy by using the secondary inference unit 40D that uses the trained model that has not high accuracy as the secondary inference but has a lightweight and a high-speed or the inference parameter. On the other hand, for a group having a high inference difficulty level, the information processing device 1D can execute inference avoiding degradation in accuracy using the secondary inference unit 40D using a trained model having high accuracy or the inference parameter. In this manner, the information processing device 1D can improve the throughput of inference of the target object while maintaining the accuracy. As described above, the secondary inference unit 40D may use the trained models different to each other or the inference parameters different to each other. The data packing unit 30D may estimate the inference difficulty level in each of the secondary inference units 40D and classify the first target object into any one of groups based on the inference difficulty level.

[Variations]

In the above description, an example of using the inference of the posture estimation task as the primary inference and the secondary inference is described. However, the present example embodiment is not limited to the posture estimation task, and for example, an object detection task may be used. In the above description, the data packing unit 30D generates information used for classification such as the inference difficulty level, but the present example embodiment is not limited thereto. For example, the primary inference unit 20D may determine the inference difficulty level in addition to the result of the primary inference to output the result to the data packing unit 30D. That is, the primary inference unit 20D may infer the inference difficulty level in each of the secondary inference units 40D. For example, the primary inference unit 20D may infer the inference difficulty level for each keypoint in the posture estimation task or each BB in the object detection task in the trained model of the primary inference. In this case, the primary inference unit 20D may use a class related to the inference difficulty level as a class to be output as a result of the primary inference.

The data packing unit 30D may classify at least some results of the primary inference into a plurality of groups. For example, the data packing unit 30D may include a result of the primary inference having a very high inference difficulty level in a plurality of packed data. In this case, at least some of the plurality of secondary inference units 40D estimate the same target object included in each of the plurality of pieces of packed data. Then, the object inference unit 10D integrates the inference results of the plurality of secondary inference units 40D to infer the target object. By using such an operation, the information processing device 1D can improve the recognition accuracy of the target object. However, in this case, there is a possibility that a plurality of inference results can be obtained for one object. Therefore, the object inference unit 10D may correct the duplicate inference result using, for example, a technology such as a non-maximum suppression method (NMS).

[Hardware Configuration]

Next, hardware of the information processing devices 1 and 1D will be described using the information processing device 1D. In the above description, an example in which the object inference unit 10D, the primary inference unit 20D, the data packing unit 30D, the secondary inference unit 40D, the data storage unit 50, the data generation unit 60, the model generation unit 70, the model storage unit 80, and the data acquisition unit 90 are included in one device is described. However, the second example embodiment is not limited thereto. For example, the information processing device 1D may be configured by connecting devices having functions related to the respective configurations via a predetermined network. For example, the information processing device 1D may be achieved using cloud computing. Alternatively, each component of the information processing device 1D may be configured by a hardware circuit. Alternatively, in the information processing device 1D, a plurality of components may be configured by one piece of hardware.

Figure 9:
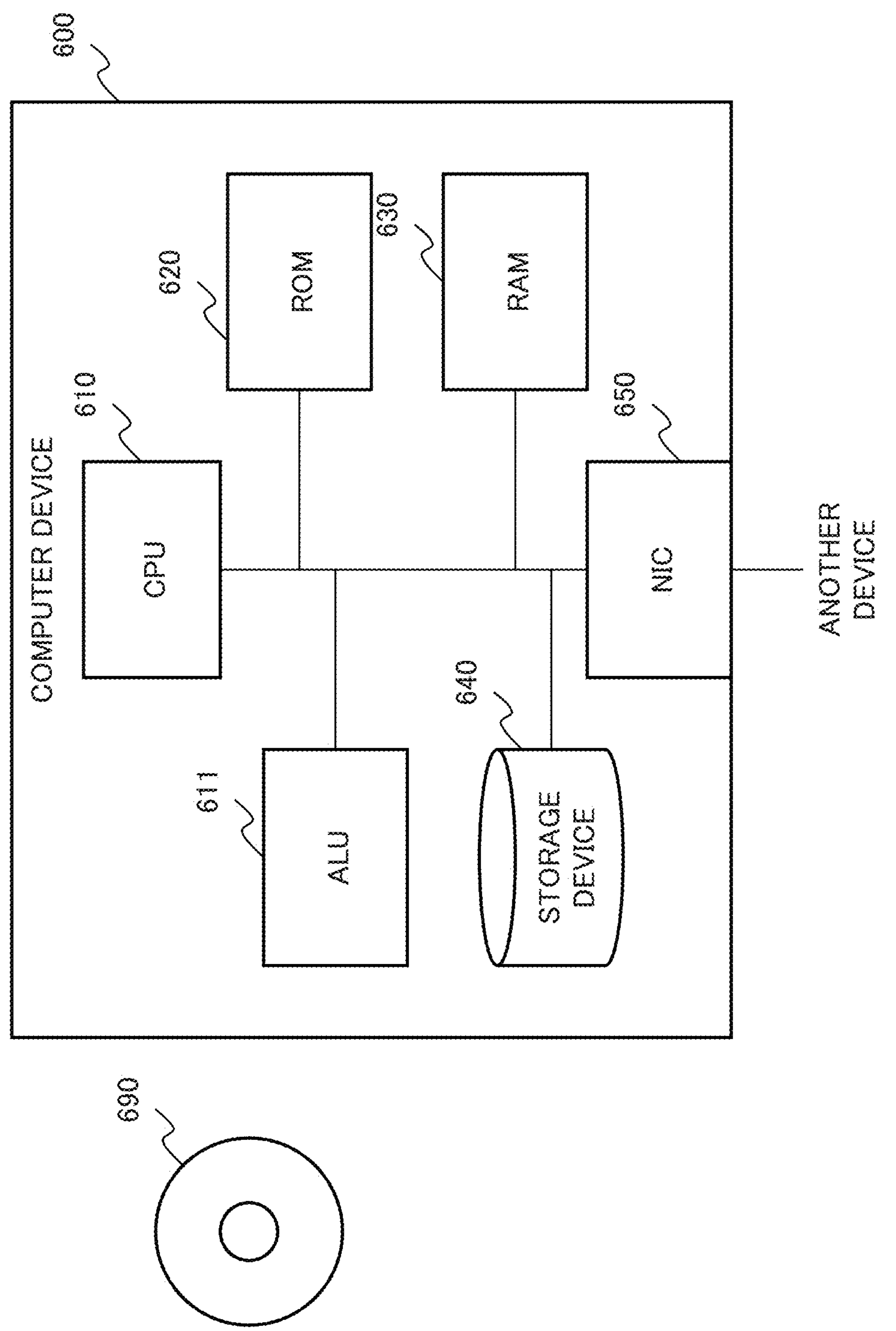
FIG. 9 is a block diagram illustrating an example of a hardware configuration of an information processing device.

Alternatively, the information processing device 1D may be achieved as a computer device including a CPU, a read only memory (ROM), and a random access memory (RAM). In addition to the above configuration, the information processing device 1D may be achieved as a computer device further including a network interface circuit (NIC). Alternatively, the information processing device 1D may be further implemented as a computer device including an arithmetic logical unit (ALU) that executes part or all of arithmetic operations of training and inference. FIG. 9 is a block diagram illustrating a configuration of the computer device 600 that is an example of a hardware configuration of each of the information processing devices 1 and 1D. The computer device 600 in FIG. 9 includes a CPU 610, an ALU 611, a ROM 620, a RAM 630, a storage device 640, and an NIC 650, and constitutes the computer device.

The CPU 610 reads a program from at least any one of the ROM 620 and the storage device 640. Then, the CPU 610 controls the ALU 611, the RAM 630, the storage device 640, and the NIC 650 based on the read program. Then, the CPU 610 implements functions as the object inference unit 10D, the primary inference unit 20D, the data packing unit 30D, the secondary inference unit 40D, the data storage unit 50, the data generation unit 60, the model generation unit 70, the model storage unit 80, and the data acquisition unit 90.

When achieving each function, the CPU 610 may use the RAM 630 or the storage device 640 as a temporary storage medium of the program. The CPU 610 may read the program included in the storage medium 690 storing the program in a computer readable manner using a storage medium reading device (not illustrated). Alternatively, the CPU 610 may receive a program from an external device (not illustrated) via the NIC 650, store the program in the RAM 630 or the storage device 640, and operate based on the stored program.

The ALU 611 is in charge of predetermined calculation processing and part of the predetermined process in the CPU 610. For example, the ALU 611 is controlled by the CPU 610 to execute calculation of part or all of training and inference. The configuration of the ALU 611 is any configuration. For example, the ALU 611 is a graphics processing unit (GPU) or a field-programmable gate array (FPGA). Alternatively, the ALU 611 may be, for example, an application specific integrated circuit (ASIC). Information (data, program, circuit information, and the like) necessary for calculation in the ALU 611 is stored in advance in the ROM 620, the RAM 630, or the storage device 640.

The ROM 620 stores programs executed by the CPU 610 and fixed data. The ROM 620 is, for example, a programmable-ROM (P-ROM) or a flash ROM. The RAM 630 temporarily stores programs and data executed by the CPU 610. The RAM 630 is, for example, a dynamic-RAM (D-RAM). The storage device 640 stores data and programs to be stored for a long time by the computer device 600. The storage device 640 may operate as the data storage unit 50. The storage device 640 may operate as the model storage unit 80. The storage device 640 may operate as a temporary storage device of the CPU 610. The storage device 640 may operate as a secondary storage device to a memory (for example, the ROM 620 and the RAM 630). The storage device 640 is, for example, a hard disk device, a magneto-optical disk device, a solid state drive (SSD), or a disk array device.

The ROM 620 and the storage device 640 are non-transitory recording media. On the other hand, the RAM 630 is a transitory recording medium. The CPU 610 can operate based on a program stored in the ROM 620, the storage device 640, or the RAM 630. That is, the CPU 610 can operate using a non-transitory recording medium or a transitory recording medium.

The NIC 650 relays exchange of data with an external device (not illustrated) via a network. The NIC 650 operates as part of the data acquisition unit 90 and the object inference unit 10D. The NIC 650 is, for example, a local area network (LAN) card. The NIC 650 is not limited to use wired communication, but may use wireless communication.

The computer device 600 of FIG. 9 configured as described above can obtain effects similar to those of the information processing device 1 of FIG. 1 and the information processing device 1D of FIG. 14. The reason is that the CPU 610 of the computer device 600 in FIG. 9 can implement the functions similar to those of the information processing device 1 and the information processing device 1D based on the program. Alternatively, this is because the CPU 610 and the ALU 611 of the computer device 600 in FIG. 9 can implement the functions similar to those of the information processing device 1 and the information processing device 1D based on a program. The information processing device 1C illustrated in FIG. 13 may be configured using the computer device 600 in FIG. 9.

[System]

Figure 10:
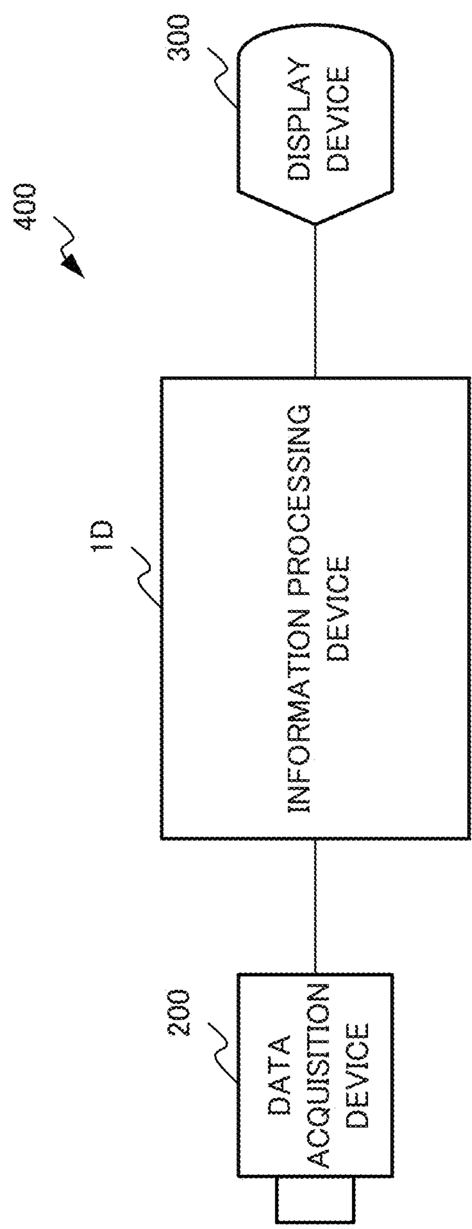
FIG. 10 is a block diagram illustrating an example of a configuration of an information processing system including an information processing device.

An example of a system including the information processing device 1, 1C, or 1D will be described using the information processing device 1D. FIG. 10 is a block diagram illustrating an example of a configuration of an information processing system 400 including the information processing device 1D. The information processing system 400 includes the information processing device 1D, a data acquisition device 200, and a display device 300. The information processing system 400 may include a plurality of devices as each device. For example, the information processing system 400 may include a plurality of data acquisition devices 200. The information processing system 400 may include a not-illustrated device. For example, the information processing system 400 may include a device that recognizes predetermined information related to the target object using the inference result of the information processing device 1D. The device that recognizes the predetermined information related to the target object is, for example, an OCR device.

The data acquisition device 200 outputs the inference target data to the information processing device 1D. The data acquisition device 200 may output the original training data set for generating the training data set to the information processing device 1D. The data acquisition device 200 is, for example, a monitoring camera. In this case, the data acquisition device 200 outputs the captured image to the information processing device 1D as the inference target data. The information processing device 1D operates as described above. That is, the information processing device 1D acquires the inference target data from the data acquisition device 200. Then, the information processing device 1D executes inference on the acquired inference target data to output an inference result to the display device 300. The display device 300 acquires the inference result from the information processing device 1D and displays the acquired inference result. The display device 300 is, for example, a liquid crystal display, an organic electroluminescence display, or electronic paper. Specifically, the display device 300 is, for example, a liquid crystal display of a monitoring system. The operator can confirm the target object by referring to display on the display device 300.

As described above, the information processing system 400 includes the information processing device 1D, the data acquisition device 200, and the display device 300. The information processing device 1D operates as described above. The data acquisition device 200 outputs the inference target data to the information processing device 1D. The display device 300 acquires a result of inference from the information processing device 1D and displays the acquired result of inference. By using the above configuration, the information processing system 400 improves the inference throughput and displays the target object inferred in the inference target data to the operator or the like.

Third Example Embodiment

The loads of the primary inference and the secondary inference are different for each trained model used for inference. For example, a trained model with high inference accuracy generally has a high load. When a trained model with a high load is used, the throughput decreases. Alternatively, the load of data packing is different related to the post-process in data packing and the packing process. Alternatively, the method of generating the packed data and the format of the packed data used in the data packing affect the inference accuracy. The method of generating the packed data used in the data packing is, for example, a method of grouping regions. Alternatively, the format of the packed data is, for example, a size and a gap between images.

As described above, the change in at least one of the primary inference, the secondary inference, and the data packing affects the throughput and the inference accuracy in the information processing devices 1, 1C, and 1D. Hereinafter, the primary inference, the secondary inference, and the data packing are collectively referred to as "inference parameters". In general, the inference accuracy and the throughput are in a trade-off relationship. The processing load and the throughput are inversely proportional to each other. For example, when the processing load is increased, the throughput is decreased, and when the processing load is decreased, the throughput is increased. Therefore, in order to prevent a decrease in inference accuracy while securing a desired throughput, it is desirable to select and use an appropriate inference parameter based on a load or throughput.

Therefore, as the third example embodiment, the example embodiment in which at least one of the inference parameters is changed based on the load or the throughput will be described. Hereinafter, the third example embodiment will be described with reference to the drawings. In the description of the third example embodiment, the configurations and operations same as those of the second example embodiment are denoted by the same reference numerals, and the detailed description thereof may be omitted. In the following description, in the third example embodiment, the trained model is changed as the change in the inference parameter. However, this does not limit the third example embodiment. In the third example embodiment, an inference parameter different from the trained model may be changed according to the load or the throughput. The change in the inference parameter will be further described later. For convenience of description, an information processing device 1B used in the following description includes one secondary inference unit 40B as a secondary inference unit. In a case where the plurality of secondary inference units 40B is used as in the information processing device 1D, in the following description, each configuration of the information processing device 1B may include a function similar to that of the related configuration in the information processing device 1D.

Figure 11:
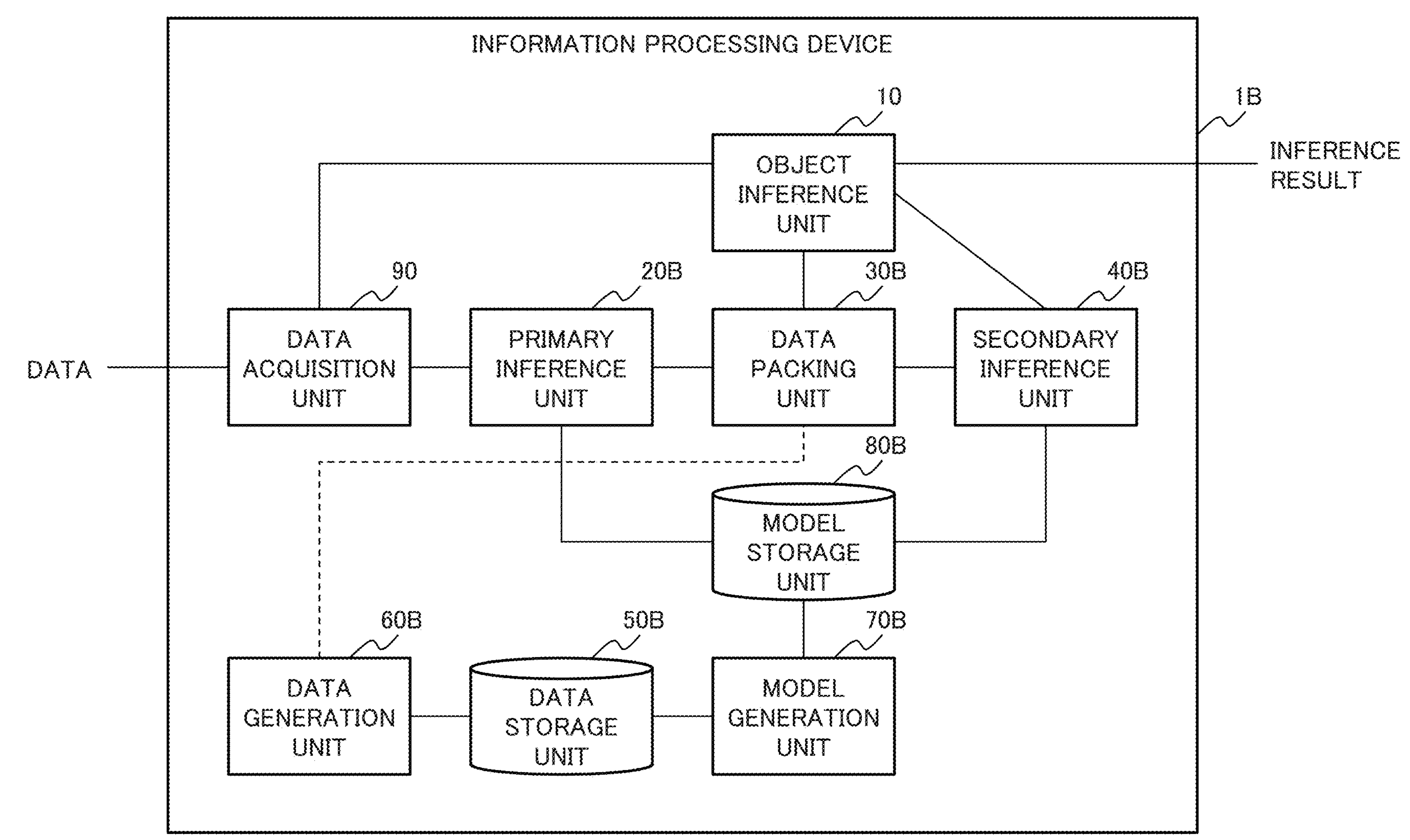
FIG. 11 is a block diagram illustrating an example of a configuration of an information processing device according to the third example embodiment.

FIG. 11 is a block diagram illustrating an example of a configuration of the information processing device 1B according to the third example embodiment. The information processing device 1B includes the object inference unit 10, a primary inference unit 20B, a data packing unit 30B, a secondary inference unit 40B, a data storage unit 50B, a data generation unit 60B, a model generation unit 70B, a model storage unit 80B, and the data acquisition unit 90. The information processing device 1B may be configured using the computer device 600 of FIG. 9 as in the second example embodiment.

The configuration for determining the load or throughput of the information processing device 1B is any configuration. For example, a monitor unit (not illustrated) may determine the load and notify each component of the load. For example, in a case where the information processing device 1B is a computer, the information processing device 1B may include a monitor of an operating system operating on the computer as a configuration for determining the load. Alternatively, a predetermined application operating on the computer may measure the processing speed of one or a plurality of components as the throughput. For example, a predetermined application may measure at least one of the number of pieces of inference target data processed by the primary inference unit 20B, the number of pieces of packed data generated by the data packing unit 30B, and the number of pieces of packed data processed by the secondary inference unit 40B in a unit time.

In the information processing device 1B, a configuration for controlling the operation of each component related to the load or the throughput is any configuration. For example, the information processing device 1B may include a control unit (not illustrated) that determines a load or throughput and controls each component. Alternatively, a predetermined configuration may determine the load or throughput and control the operations of the components such as the primary inference unit 20B, the data packing unit 30B, and the secondary inference unit 40B. Alternatively, for example, the primary inference unit 20B, the data packing unit 30B, and the secondary inference unit 40B may determine the load or the throughput and change the inference parameter associated with each. Therefore, in the following description, description of a component that controls an operation related to a load in each component is omitted unless otherwise necessary.

Furthermore, a configuration for which a load or throughput is determined and a configuration for switching an inference parameter are any configuration. For example, the load or throughput may be a load or throughput in the entire information processing device 1B. For example, the information processing device 1B may switch the inference parameters of the primary inference unit 20B, the data packing unit 30B, and the secondary inference unit 40B in such a way that the throughput of the entire information processing device 1B is appropriate for the inference target data. Alternatively, the determination target of the load or throughput may be the load or throughput in one or some configurations of the information processing device 1B. For example, the information processing device 1B may switch the inference parameter of a certain configuration in accordance with the load or throughput of the configuration at the preceding stage or the subsequent stage of the configuration.

For example, the primary inference unit 20B may switch the trained model for primary inference in accordance with the load of the data packing unit 30B. For example, in a case where the load of the data packing unit 30B is high, the primary inference unit 20B uses a trained model with a high load, that is, a trained model with high inference accuracy. Conversely, in a case where the load of the data packing unit 30B is low, the primary inference unit 20B uses the trained model with a low load. Alternatively, the secondary inference unit 40B may switch the trained model for secondary inference in accordance with the load of the data packing unit 30B. For example, in a case where the load of the data packing unit 30B is high, the secondary inference unit 40B uses a trained model with a high load, that is, a trained model with high inference accuracy. Conversely, in a case where the load of the data packing unit 30B is low, the secondary inference unit 40B uses the trained model with a low load.

Next, each configuration will be described. The object inference unit 10 and the data acquisition unit 90 are similar to the object inference unit 10 and the data acquisition unit 90 of the second example embodiment, and thus detailed description thereof will be omitted.

As in the data generation unit 60, the data generation unit 60B generates a primary inference training data set and a secondary inference training data set using the original training data set. Then, the data generation unit 60B stores the generated primary inference training data set and the generated secondary inference training data set in the data storage unit 50B. However, in the third example embodiment, at least one of the primary inference unit 20B and the secondary inference unit 40B uses a plurality of trained models. Therefore, the data generation unit 60B generates a plurality of training data sets as at least one of the primary inference training data set and the secondary inference training data set.

For example, the data generation unit 60B may generate a plurality of training data sets by applying a general data augmentation method to the original training data set stored in the data storage unit 50B. A data augmentation method is any method. In a case where the data is an image, examples of the data augmentation method include horizontal inversion, vertical inversion, partial cropping, combining, enlargement or reduction, brightness adjustment, luminance adjustment, color adjustment, and combinations thereof.

As in the data storage unit 50, the data storage unit 50B stores the primary inference training data set and the secondary inference training data set. Each of the primary inference training data set and the secondary inference training data set is a training data set used for generating a trained model used by the primary inference unit 20B and the secondary inference unit 40B. However, in the third example embodiment, at least one of the primary inference unit 20B and the secondary inference unit 40B uses a plurality of trained models. Therefore, the data storage unit 50B stores a plurality of training data sets as at least one of the primary inference training data set and the secondary inference training data set.

As in the model generation unit 70, the model generation unit 70B generates a trained model for primary inference and a trained model for secondary inference using the training data set. However, in the third example embodiment, at least one of the primary inference unit 20B and the secondary inference unit 40B uses a plurality of trained models. Therefore, the model generation unit 70B generates a plurality of trained models as at least one trained model of the trained model for primary inference and the trained model for secondary inference. Then, the model generation unit 70B stores the generated trained model in the model storage unit 80B. Specifically, the model generation unit 70B generates a plurality of trained models using a plurality of training data sets stored in the data storage unit 50B as at least one trained model of the trained model for primary inference and the trained model for secondary inference. However, the model generation unit 70B may generate a plurality of trained models using one training data set.

The plurality of trained models generated by the model generation unit 70B is any model. For example, the model generation unit 70B may generate a model in which any one of the following is different as the trained model.

(1) a training data set used for training, (2) a network structure of the model, (3) a hyperparameter of the model, (4) weight accuracy included in the model, (5) a batch size in the model, (6) a positional relationship of the sub-target object with respect to the target object, (7) the number of sub-target objects for the target object The model generation unit 70B may generate an index to be used for selection of the trained model for the plurality of generated trained models. For example, the model generation unit 70B may generate a value such as a processing load, throughput performance, a scale, or a size of the generated trained model or a comparison result of at least some of these as an index of selection of the trained model.

The model storage unit 80B stores the trained model as in the model storage unit 80. However, in the third example embodiment, at least one of the primary inference unit 20B and the secondary inference unit 40B uses a plurality of trained models. Therefore, the model storage unit 80B stores a plurality of trained models as at least one trained model of the trained model for primary inference and the trained model for secondary inference.

The data packing unit 30B generates packed data as in the data packing unit 30. However, the data packing unit 30B may change data packing including at least one of the post-process and the data packing process according to a predetermined load or throughput in the information processing device 1B. The change in the data packing in the data packing unit 30B will be further described later.

The primary inference unit 20B executes primary inference as in the primary inference unit 20. The secondary inference unit 40B executes secondary inference as in the secondary inference unit 40. Furthermore, at least one of the primary inference unit 20B and the secondary inference unit 40B switches the trained model used for inference according to a predetermined load or throughput in the information processing device 1B. At least one of the primary inference unit 20B and the secondary inference unit 40B may switch trained models equal to or more than three instead of two. In a case where both the primary inference unit 20B and the secondary inference unit 40B switch the trained model, the primary inference unit 20B and the secondary inference unit 40B may use the same threshold value or may use different threshold values as the threshold value used for determination of the load or the throughput.

The load and throughput used for the determination in the third example embodiment are any load and throughput. The operator may determine the load or throughput used for the determination based on the target object, the trained model, and the like. For example, the information processing device 1B may use at least one of the following items as the load or the throughput. The information processing device 1B may use a combination of items equal to or more than two instead of one item. In a case where the following values are used, the information processing device 1B may use statistical processing such as averaging.

(1) a hardware resource related to calculation constituting the information processing device 1B, (1-1) a usage rate or an operation rate of at least one of the CPU and the ALU, (1-2) a length of a data queue for processing in at least one of the configurations in the information processing device 1B, or a processing waiting time, (1-3) a measurement value of a sensor that detects a temperature or power consumption included in the information processing device 1B, (2) a size of inference target data, (3) a result of the primary inference in the primary inference unit 20B, such as the number or the area of the BBs to be post-processed, (4) a result of the post-process in the data packing unit 30B, such as the number or the area of the BB after the post-process, (5) a packing result in the data packing unit 30B, such as the size of the packed data, (6) a ratio between the size of the inference target data and the size of the packed data, (7) as a result of secondary inference in the secondary inference unit 40B, such as the number or the area of the BBs included in the secondary inference, (8) processing time of at least one of the primary inference and the secondary inference. The processing time may be an actually measured time or may be a time calculated using a preset relationship between the size of the inference target data and the processing time.

The information processing device 1B may switch the inference parameter based on another information instead of the load and the throughput or in addition to the load or the throughput. For example, an imaging range of a monitoring camera of a system that detects an intruder may include a range in which required inference accuracy is different. For example, it is desirable that the range near the entrance has high inference accuracy. On the other hand, in the range far from the entrance, in order to reduce unnecessary power consumption, it is desirable to reduce the load necessary for inference even if the inference accuracy is low. Therefore, for example, the information processing device 1B usually uses an inference parameter with a low load. The inference parameter with a low load is, for example, a trained model with a low load. Then, for example, in a case where the human sensor detects the intrusion of a person into a predetermined range or the approach of the person to the vicinity of the entrance, the information processing device 1B may switch to the inference parameter with high inference accuracy. For example, the inference parameter with high inference accuracy is a trained model with high inference accuracy. In this manner, the information processing device 1B may switch the inference parameter according to predetermined information such as an event detected by a sensor.

The change in the inference parameters in the primary inference unit 20B and the secondary inference unit 40B includes the following change including the change in the trained model in the above description. However, the change in the inference parameter is not limited to the following.

(1) Change in Trained Model Used for Inference:

When a trained model with a low load is used, the throughput of the primary inference unit 20B and the secondary inference unit 40B is improved. However, the inference accuracy decreases. In a case where a trained model having a high load but high accuracy is used, the throughput of the primary inference unit 20B and the secondary inference unit 40B decreases. However, the inference accuracy increases.

(2) Change in Predetermined Amount by which the Primary Inference is Collectively Executed:

In a case where the predetermined amount by which the primary inference is collectively executed is reduced, the information processing device 1B can shorten the time until the final inference result for the inference target data is obtained. The time until the final inference result is obtained is, for example, latency.

Next, a change in the inference parameter (in particular, data packing) related to the data packing unit 30B will be described. The data packing unit 30B may change the following inference parameter based on a predetermined load or throughput in the information processing device 1B.

(1) Change in Parameter in Data Packing Such as a Threshold Value or Correction Amount of the BB in BB Filtering or BB Adjustment:

In a case where the filtering threshold value is changed in such a way that the number of filtering targets is reduced, that is, the number of pieces of data after filtering is reduced, the throughput of the data packing unit 30B is improved. However, the inference accuracy in the secondary inference unit 40B decreases. In a case where the filtering threshold value is changed in such a way that the number of filtering targets increases, that is, the number of pieces of data after filtering increases, the throughput of the data packing unit 30B decreases. However, the inference accuracy in the secondary inference unit 40B is improved.

(2) Change in Gap Provided Between Data to be Duplicated in Packed Data:

In a case where the gap is narrowed, the throughput of the data packing unit 30B is improved. However, the inference accuracy in the secondary inference unit 40B decreases. In a case where the gap is widened, the throughput of the data packing unit 30B decreases.

However, the inference accuracy in the secondary inference unit 40B is improved.

(3) How to Collect Regions:

(3-1) Change as to Whether Duplicate Regions and Adjacent Regions are Collected:

In a case where the regions are not collected, the throughput of the data packing unit 30B is improved. However, the inference accuracy in the secondary inference unit 40B decreases. In a case of collecting the regions, the throughput of the data packing unit 30B decreases. However, the inference accuracy in the secondary inference unit 40B is improved.

(3-2) Change in Distance Determined to be Proximity:

In a case where the distance determined to be proximity is shortened, the throughput of the data packing unit 30B is improved. However, the inference accuracy in the secondary inference unit 40B decreases. In a case where the distance determined to be proximity is increased, the throughput of the data packing unit 30B decreases. However, the inference accuracy in the secondary inference unit 40B is improved.

(4) Change in Size of Packed Data:

In a case where the size of the packed data is reduced, the throughput of the data packing unit 30B is improved. However, the inference accuracy in the secondary inference unit 40B decreases. In a case where the size of the packed data is increased, the throughput of the data packing unit 30B decreases. However, the inference accuracy in the secondary inference unit 40B is improved.

The information processing device 1B may change items related to a plurality of constituent elements as follows as the inference parameter.

(1) Change in Use of Sub-Target Object:

The information processing device 1B may switch whether to use the sub-target object according to the load. In a case where the sub-target object is not used, the throughput of the information processing device 1B is improved. However, the final inference accuracy decreases. In a case where the sub-target object is used, the throughput of the information processing device 1B decreases. However, the final inference accuracy is improved.

(2) Presence or Absence of Primary Inference:

The information processing device 1B may switch whether to use the primary inference unit 20B according to the load. In a case where the primary inference is not used in a situation where the number of pieces of packed data is large, the throughput of the information processing device 1B is improved. In a case where the primary inference is used in a situation where the number of pieces of packed data is large, the throughput of the information processing device 1B decreases. As described above, the switching of the primary inference included in the inference parameter includes the presence or absence of execution of the primary inference. The operation of another component in a case where the primary inference is not used is any operation. For example, in a case where the primary inference is not used, the data packing unit 30B may generate the packed data using the inference target data. Alternatively, in a case where the primary inference is not used, the secondary inference unit 40B may infer the target object in the inference target data as the secondary inference.

Next, an operation of the information processing device 1B according to the third example embodiment will be described with reference to the drawings. In the following description, an average value of the number of pieces of packed data generated per unit time by the data packing unit 30B is used as an example of the load. Hereinafter, the average value of the number of pieces of packed data generated per unit time is referred to as a "packed data generation speed". The trained model for primary inference used by the primary inference unit 20B is used as the inference parameter to be changed. The information processing device 1B operates to obtain higher inference accuracy in a situation where the load is low. Specifically, in a case where the packed data generation speed is equal to or less than the threshold value, that is, in a case where the load is low, the primary inference unit 20B uses a trained model with high accuracy, that is, a trained model with a high load, in the primary inference. Conversely, in a case where the packed data generation speed exceeds the threshold value, that is, in a case where the load is high, the primary inference unit 20B uses a trained model with a low load, that is, a trained model with low accuracy, in the primary inference.

Figure 12:
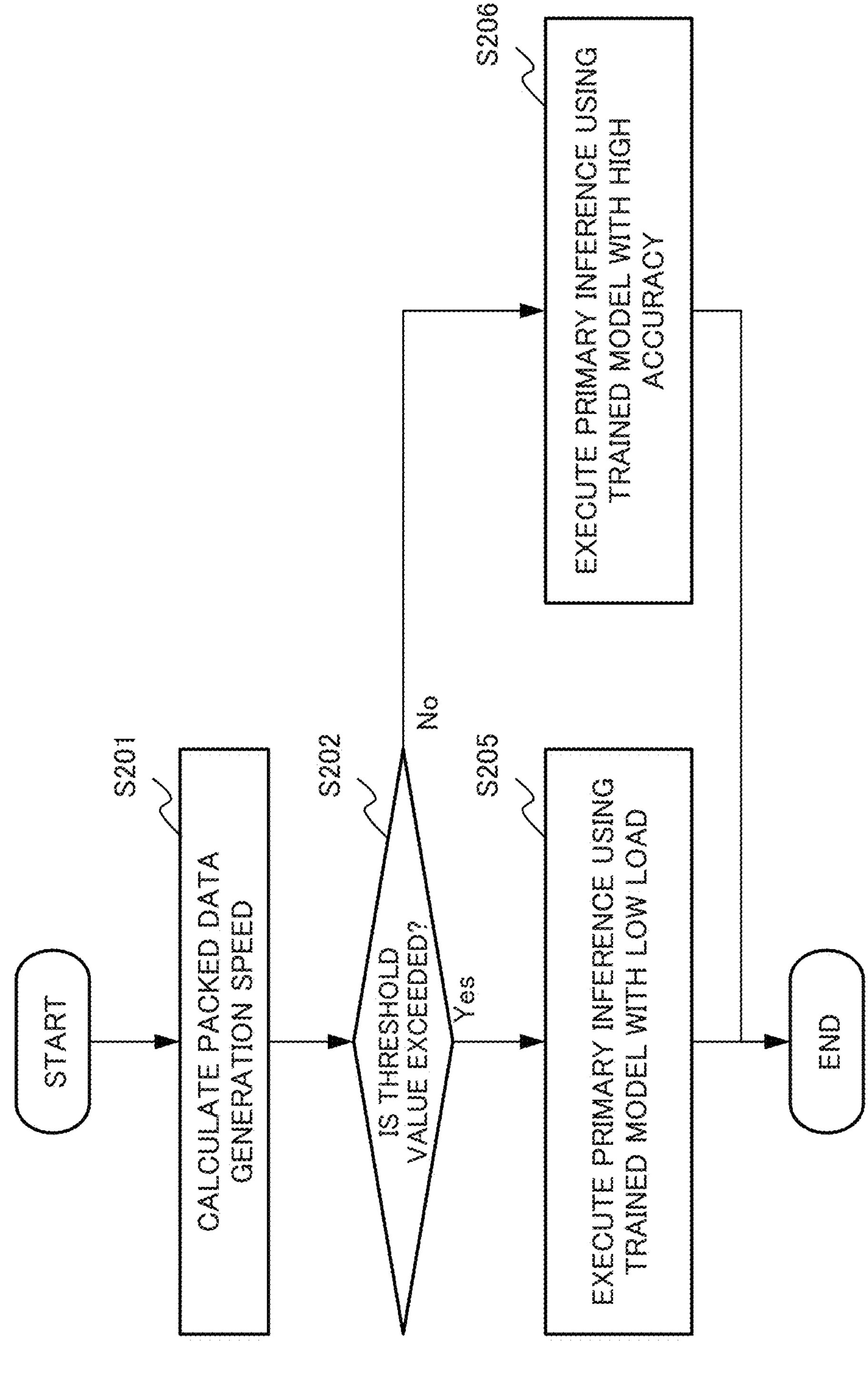
FIG. 12 is a flowchart illustrating an example of a model switching operation in the information processing device according to the third example embodiment.

FIG. 12 is a flowchart illustrating an example of the model switching operation in the information processing device 1B according to the third example embodiment. FIG. 12 is an example of an operation in which the primary inference unit 20B switches the trained model for primary inference used for primary inference in accordance with the packed data generation speed. The information processing device 1B calculates the packed data generation speed (step S201). The information processing device 1B determines whether the packed data generation speed exceeds a predetermined threshold value (step S202). When the packed data generation speed exceeds the threshold value (Yes in step S202), the primary inference unit 20B executes primary inference using a trained model with a low load as primary inference (step S205). When the packed data generation speed is equal to or less than the threshold value (No in step S202), the primary inference unit 20B executes primary inference using a trained model with high accuracy as primary inference (step S206). The information processing device 1B repeats the above operation at predetermined intervals. Using such an operation, the information processing device 1B switches the trained model for primary inference used by the primary inference unit 20B according to the throughput or the load of the data packing unit 30B.

In this manner, the information processing device 1B switches at least one of the inference parameters based on a predetermined load or throughput in the information processing device 1B. For example, the information processing device 1B switches operation or data to be handled of at least one of the primary inference unit 20B, the secondary inference unit 40B, and the data packing unit 30B based on a predetermined load or throughput in the information processing device 1B. For example, the information processing device 1B switches at least one of the trained model for primary inference used by the primary inference unit 20B and the trained model for secondary inference used by the secondary inference unit 40B based on the load or throughput of the data packing unit 30B. Alternatively, the information processing device 1B switches the data packing processing in the data packing unit 30B based on the load or throughput of the primary inference unit 20B or the secondary inference unit 40B. In this manner, the information processing device 1B according to the third example embodiment changes the inference parameter according to a predetermined load or throughput in the information processing device 1B.

By using such an operation, the information processing device 1B suppresses a decrease in throughput and avoids generation of data that cannot be processed when the load increases. On the other hand, when the load decreases, the information processing device 1B switches the inference parameter in such a way that the load increases. By using such an operation, the information processing device 1B achieves inference with appropriate accuracy while securing throughput.

Although the present invention is described above with reference to the example embodiments, the present invention is not limited to the above example embodiments. It will be understood by those of ordinary skill in the art that various changes in form and details may be made therein without departing from the spirit and scope of the present invention as defined by the claims.

REFERENCE SIGNS LIST

1 information processing device
1B information processing device
1C information processing device
1D information processing device
10 object inference unit
10D object inference unit
20 primary inference unit
20B primary inference unit
20D primary inference unit
30 data packing unit
30B data packing unit
30D data packing unit
40 secondary inference unit
40B secondary inference unit
40D secondary inference unit
50 data storage unit
50B data storage unit
60 data generation unit
60B data generation unit
70 model generation unit
70B model generation unit
80 model storage unit
80B model storage unit
90 data acquisition unit
200 data acquisition device
300 display device
400 information processing system
600 computer device
610 CPU
611 ALU
620 ROM
630 RAM
640 storage device
650 NIC
690 storage medium

What is claimed is:

1. An information processing device comprising:

a memory configured to store instructions; and one or more processors configured to execute the instructions to:

apply inference target data at least part of which includes first target object to a first trained model to infer, as a primary inference, the first target object;

classify, into any one of groups based on an attribute of the first target object, the first target object inferred in the primary inference, generate packed data that is data having a smaller amount than an amount of the inference target data for each group, and generate a correspondence between a position of the first target object in the inference target data and a position of the first target object in the packed data;

apply the packed data of the groups different to each other to a plurality of second trained models to infer, as a plurality of secondary inferences, the first target object; and infer the first target object in the inference target data using the first target object in results of the plurality of secondary inferences and the correspondence.

2. The information processing device according to claim 1, wherein the one or more processors are further configured to execute the instructions to:

use the second trained models different to each other or inference parameters different to each other.

3. The information processing device according to claim 1, wherein the one or more processors are further configured to execute the instructions to:

estimate an inference difficulty level in each of the secondary inference and classify the first target object into any one of the groups based on the inference difficulty level.

4. The information processing device according to claim 3, wherein the one or more processors are further configured to execute the instructions to:

infer the inference difficulty level in each of the secondary inferences.

5. An information processing method comprising:

applying inference target data at least part of which includes first target object to a first trained model to infer, as a primary inference, the first target object;

classifying, into any one of groups based on an attribute of the first target object, the first target object inferred in the primary inference, generate packed data that is data having a smaller amount than an amount of the inference target data for each group, and generate a correspondence between a position of the first target object in the inference target data and a position of the first target object in the packed data;

applying the packed data of the groups different to each other to a plurality of second trained models to infer, as a plurality of secondary inferences, the first target object; and inferring the first target object in the inference target data using the first target object in-a results of the plurality of secondary inferences and the correspondence.

6. A non-transitory computer-readable recording medium that records a program for causing a computer to execute the steps of:

applying inference target data at least part of which includes first target object to a first trained model to infer, as a primary inference, the first target object;

classifying, into any one of groups based on an attribute of the first target object, the first target object inferred in the primary inference, generate packed data that is data having a smaller amount than an amount of the inference target data for each group, and generate a correspondence between a position of the first target object in the inference target data and a position of the first target object in the packed data;

applying the packed data of the groups different to each other to a plurality of second trained models to infer, as a plurality of secondary inferences, the first target object; and inferring the first target object in the inference target data using the first target object in-a results of the plurality of secondary inferences and the correspondence.

* * * * *